(12) United States Patent
Fushiki et al.

(10) Patent No.: US 7,636,630 B2
(45) Date of Patent: Dec. 22, 2009

(54) TRAFFIC INFORMATION PREDICTION DEVICE WITH DAY-FACTORS AND DAY FACTOR CLASSIFICATIONS

(75) Inventors: Takumi Fushiki, Marunouchi (JP); Masatoshi Kumagai, Marunouchi (JP); Takayoshi Yokota, Marunouchi (JP); Kazuya Kimita, Marunouchi (JP)

(73) Assignee: Hitachi, Ltd., Tokyo (JP)

( * ) Notice: Subject to any disclaimer, the term of this patent is extended or adjusted under 35 U.S.C. 154(b) by 509 days.

(21) Appl. No.: 11/189,780

(22) Filed: Jul. 27, 2005

(65) Prior Publication Data

US 2006/0025925 A1 Feb. 2, 2006

(30) Foreign Application Priority Data

Jul. 28, 2004 (JP) ............................. 2004-219491

(51) Int. Cl.
*G01C 21/00* (2006.01)
(52) U.S. Cl. ...................... 701/204; 701/117; 701/118; 701/119; 340/905; 340/907
(58) Field of Classification Search ................ 701/117, 701/118, 119, 204; 340/905, 907
See application file for complete search history.

(56) References Cited

U.S. PATENT DOCUMENTS

| | | | | |
|---|---|---|---|---|
| 6,256,577 | B1 * | 7/2001 | Graunke | 701/117 |
| 6,526,349 | B2 * | 2/2003 | Bullock et al. | 701/209 |
| 6,546,330 | B2 | 4/2003 | Kumagai et al. | |
| 6,558,164 | B2 * | 5/2003 | Raha | 434/62 |
| 2005/0043880 | A1 | 2/2005 | Yamane et al. | |

FOREIGN PATENT DOCUMENTS

| | | |
|---|---|---|
| JP | 7-081570 | 3/1995 |
| JP | 2000-259977 | 9/2000 |
| JP | A-2001-118188 | 4/2001 |
| JP | 2002-206935 | 7/2002 |
| JP | 2002-206936 | 7/2002 |
| JP | 2004-062594 | 2/2004 |
| JP | 2004-108849 | 4/2004 |

OTHER PUBLICATIONS

U.S. Appl. No. 10/753,408, filed Jan. 27, 2005, Yamane et al.

\* cited by examiner

*Primary Examiner*—Khoi Tran
*Assistant Examiner*—Nikhil Sriraman
(74) *Attorney, Agent, or Firm*—Crowell & Moring LLP

(57) ABSTRACT

There is provided a prediction calculation system capable of allowing a numerical traffic information to be predicted in such a manner that day factors and the like are reflected thereon. Even if a day whose combination of the day factors is the same as that of a prediction-target day, i.e., a day with the same instance, does not exist within a time-period during which past traffic information has been accumulated, the prediction calculation unit merges the past traffic information appropriately, thereby predicting traffic information corresponding to the objective combination of the day factors. Concretely, the prediction calculation unit combines some of characteristic quantities of the past traffic information on a day-unit basis, thereby approximately reconstructing and predicting the instance.

7 Claims, 15 Drawing Sheets

FIG.10

| LINK 1 | DAY-FACTORS PARAMETERS |
| | PREDICTION COEFFICIENTS |
| | BASIS COMPONENTS |
| LINK 2 | DAY-FACTORS PARAMETERS |
| | PREDICTION COEFFICIENTS |
| | BASIS COMPONENTS |
| LINK 3 | DAY-FACTORS PARAMETERS |
| | PREDICTION COEFFICIENTS |
| | BASIS COMPONENTS |
| ⋮ | ⋮ |
| LINK n | DAY-FACTORS PARAMETERS |
| | PREDICTION COEFFICIENTS |
| | BASIS COMPONENTS |

FIG.11

| | |
|---|---|
| DAY-FACTORS PARAMETERS | LINK 1 |
| | LINK 2 |
| | LINK 3 |
| | ... |
| | LINK n |
| PREDICTION COEFFICIENTS | LINK 1 |
| | LINK 2 |
| | LINK 3 |
| | ... |
| | LINK n |
| BASIS COMPONENTS | LINK 1 |
| | LINK 2 |
| | LINK 3 |
| | ... |
| | LINK n |

MESH-CODE SELECTION

| 533906 | ←1501 |
| 533907 | ←1502 |
| 533910 | |
| 533911 | |
| 533912 | |
| 533913 | |
| 533914 | |
| 533915 | |
| 533916 | |
| 533917 | |
| 533920 | |
| 533921 | |
| 533922 | |

AREA SELECTION

| IBARAGI PREFECTURE | ←1604 |
| TOKYO | ←1601 |
| KANAGAWA PREFECTURE | |

| HITACHI-SHI | ←1605 |
| HITACHINAKA-SHI | |
| MITO-SHI | ←1602 |

| OMIKA-CHO | ←1606 |
| MORIYAMA-CHO | ←1603 |
| OUNUMA-CHO | |

FIG.20

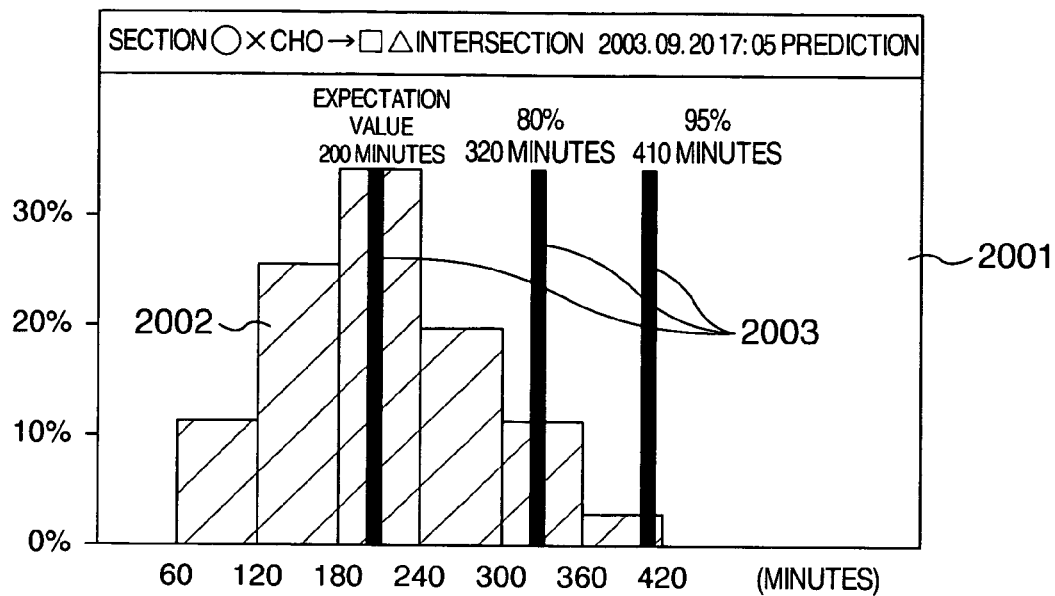

SECTION ○×CHO → □△INTERSECTION 2003.09.20 17:05 PREDICTION

EXPECTATION VALUE 200 MINUTES
80% 320 MINUTES
95% 410 MINUTES

FIG.21

SECTION ○×CHO → □△INTERSECTION

EXPECTATION NECESSITY TIME        DELAY RISK LEVEL B
200 MINUTES

EACH-TIME-ZONE-SPECIFIC DELAY RISK

| DEPARTURE POINT-IN-TIME | NECESSITY TIME | DELAY RISK LEVEL |
|---|---|---|
| 16:00 | 120 MINUTES | A |
| 17:00 | 200 MINUTES | C |
| 18:00 | 300 MINUTES | C |
| 19:00 | 280 MINUTES | B |

DELAY-RISK-LEVEL EXPLANATORY NOTES
A...PROBABILITY THAT DELAY TIME FALLS WITHIN 10 MINUTES 90%
B...PROBABILITY THAT DELAY TIME FALLS WITHIN 30 MINUTES 90%
C...PROBABILITY THAT DELAY TIME FALLS WITHIN 60 MINUTES 90%

TRAFFIC INFORMATION PREDICTION DEVICE WITH DAY-FACTORS AND DAY FACTOR CLASSIFICATIONS

BACKGROUND OF THE INVENTION

1. Field of the Invention

The present invention relates to prediction on traffic information. In particular, it relates to a prediction device for predicting traffic information which adds therein day factors, such as days of the week and "gotoobi" days, and which includes arrival-time delay risk. Here, the above-described "gotoobi" days mean settlement days of integral multiples of 5 specified such as 5th date, 10th date and so on, according to Japanese-specific sense of good omen.

2. Description of the Related Art

The traffic-information prediction method using the regression analysis, i.e., one of the mainstreams of conventional traffic-information prediction methods, allows prediction on numerical traffic information, such as travel time, congestion level, and traffic volume, in such a manner that the day factors are reflected on the numerical traffic information. Application target for this traffic-information prediction method is prediction on traffic information on a day-unit basis, e.g., location traffic volume per day and congestion level during a certain specific time-zone. If, however, the day factors are selected as explanatory variable quantities in the regression analysis, the explanatory variable quantities become the information on the day-unit basis. As a result, this traffic-information prediction method is unsuitable for prediction on traffic information which is not defined on the day-unit basis, such as travel time with a several-minute interval.

In association with this point, as technology which allows execution of prediction on traffic information with an arbitrary period, such as the travel time with a several-minute interval, there has been known the use of the following method: Namely, the traffic information is classified according to the day factors, and the information classified in this way is stored and accumulated. The use of this method has been shown in, e.g., Necessity Time Guidance presented by the Capital Expressway Corporation.

SUMMARY OF THE INVENTION

At the time of performing traffic-information prediction by using traffic information classified according to the day factors, there are some cases where the day factors are combined with each other. An example of this combination is such that a day of the prediction target is Monday and one of the gotoobi days at the same time.

Accordingly, considering that the prediction calculation is performed by retrieving past traffic information under an instance on a prediction-target day, i.e., a combination of corresponding day factors, it is desirable to be able to perform an accurate prediction even if the instance on the prediction-target day does not exist within a time-period during which the traffic information has been accumulated.

In view of the above-described problem, an object of the present invention is to implement a traffic-information prediction method where a combination of desired day factors is made selectable on the user side as well.

Also, in the conventional traffic-information prediction method described in the above-described explanation, prediction on necessity time value in a prediction-target section is selected as the prediction target. As a result, the prediction target does not include up to the risk of a delay in ordinary driving time in the prediction-target section.

As a solving unit for the above-described problem, the present invention implements a device for predicting the arrival-time delay risk along a road through the prediction on the traffic information.

The present invention includes the following processing steps: Displaying map of an area including a prediction-target route between two locations, receiving input of plural day factors of a prediction-target day, or input of date of the prediction-target day, determining traffic-information time-sequence data based on past traffic-information time-sequence data on the prediction-target route, the traffic-information time-sequence data corresponding to the plural day factors inputted, and displaying the determined traffic-information time-sequence data as a graph.

Also, the present invention includes the following processing steps: Determining plural basis components and plural characteristic quantities, or feature quantities, from past traffic-information time-sequence data, the characteristic quantities being applied to the respective basis components as coefficients when traffic-information time-sequence data is approximated from the basis components, determining coefficients in a characteristic-quantity estimation model from combination information on day factors and the characteristic quantities on each day basis during a calculation-target time-period, the characteristic-quantity estimation model approximating the characteristic quantities as functions of plural day factors, determining, based on the characteristic-quantity estimation model, characteristic-quantity estimation values for combination information on day factors on a certain day in the future, and providing traffic information estimation values which are acquired by merging the basis components with the characteristic-quantity estimation values used as coefficients.

Moreover, the traffic-information prediction device includes a route input device for specifying a prediction-target route between two locations, or an area input device for specifying an area corresponding thereto, and a day-factors classification setting unit for setting day-factors classification in the prediction-target route.

Also, in the present invention, the traffic-information prediction device includes a time-delay-risk predicting unit for predicting arrival-time delay risk which is represented by combination of delay-time class value and delay occurrence probability, or by delay risk level.

According to the present invention, it becomes possible to predict traffic information under a desired instance.

BRIEF DESCRIPTION OF THE DRAWINGS

FIG. 10 illustrates an example of communications format in the embodiment where the prediction system is applied to the communications-type navigation device and the traffic information center;

FIG. 11 illustrates an example of the communications format in the embodiment where the prediction system is applied to the communications-type navigation device and the traffic information center;

FIG. 20 illustrates an example of a time-delay-risk display screen;

FIG. 21 illustrates an example of the time-delay-risk display screen;

DETAILED DESCRIPTION OF THE INVENTION

Figure 1:
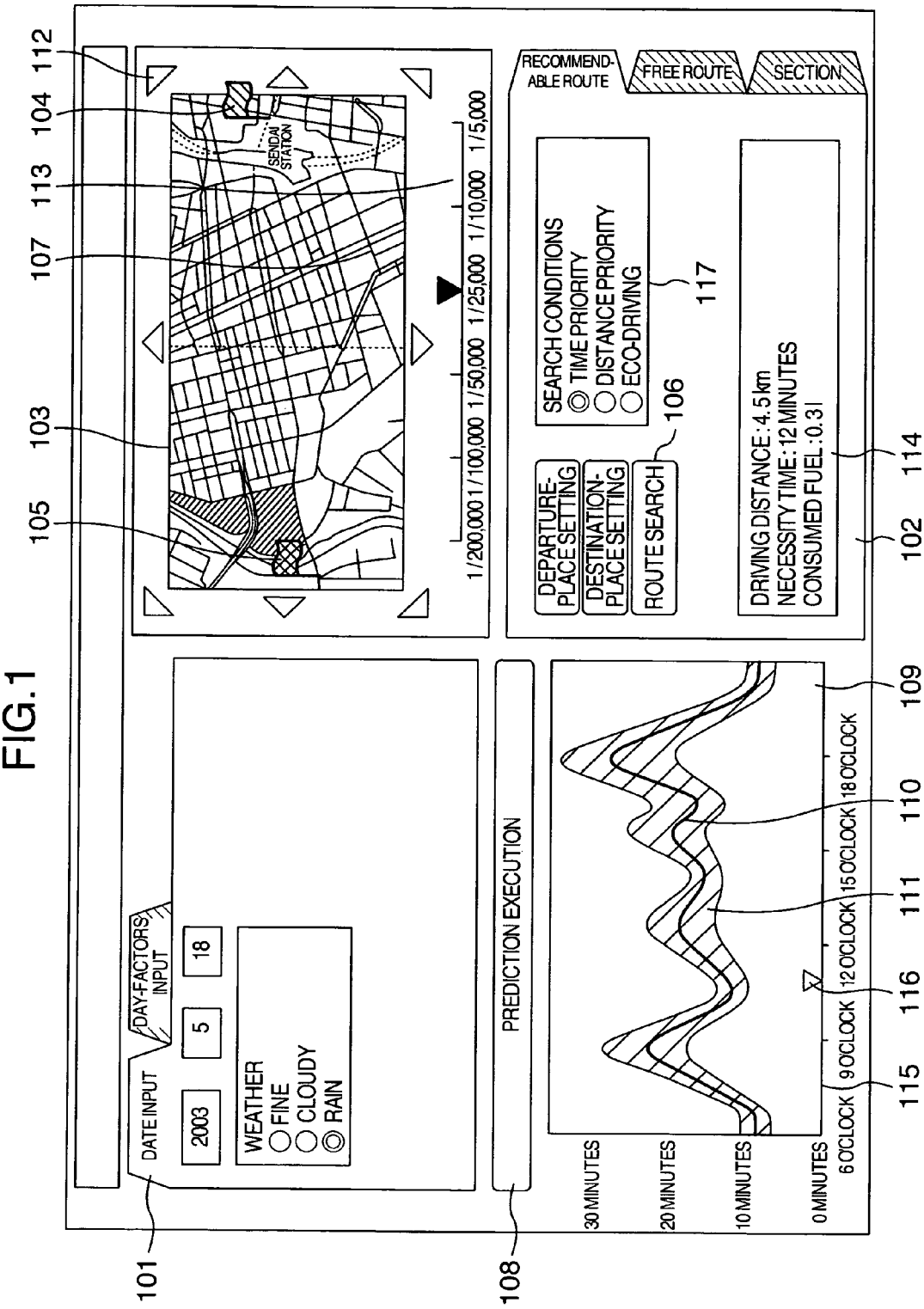
FIG. 1 illustrates an example of an operating screen of a traffic-information prediction system.

Hereinafter, referring to the drawings, the explanation will be given below concerning prediction on traffic information according to the present invention.

Embodiment 1

FIG. 1 illustrates an operating screen of a traffic-information prediction system which is an embodiment of the present invention. A date input field 101 is an interface for inputting the date of a prediction-target day. A recommendable-route input field 102 is an interface for specifying a route which becomes the prediction target. A departure place 104 and a destination place 105 are set in a map display field 103, then selecting a route search button 106. This operation displays a traffic-information prediction-target route 107 on the map display field 103. After specifying the date in the date input field 101, and determining the prediction-target route 107 in the recommendable-route input field 102, a prediction execution button 108 is selected. This operation displays a travel-time prediction graph 110 in a travel-time display field 109 on the recommendable route 107. An error range 111 indicates, on time sequence, the range of an error which an actual travel time might be able to take with a probability of, e.g., 80% if one drives on the prediction-target route at a certain point-in-time.

The map displayed on the map display field 103 can be scrolled by selecting scroll buttons 112 located in its surroundings, or by dragging the map itself. Also, this map can be changed in scale by selecting a proper position on a scale display field 113. A route-information display field 114 within the recommendable-route input field 102 displays predicted information such as driving distance on the recommendable route and travel time and consumed fuel at a specific point-in-time. The point-in-time which becomes the target at which the travel time and the consumed fuel are displayed in the route-information display field 114 can be specified using a point-in-time cursor 116. This is performed by selecting a proper position on a point-in-time axis 115 of the travel-time display field 109. Also, if a dynamical route search algorithm which reflects the traffic information had been used in determining the prediction-target route 107, the prediction-target route changes depending on a point-in-time in question. This point-in-time, however, can also be specified using the point-in-time cursor 116. Search conditions such as time priority and distance priority at the time of determining the prediction-target route using the dynamical route search algorithm can be specified in a search-conditions specification field 117.

In FIG. 1, the date of the prediction-target day has been inputted from the date input field 101. In substitution therefor, however, the prediction on the traffic information can also be carried out by inputting a combination of day factors from a day-factors input field 201 illustrated in FIG. 2. Here, the day factors are items such as a day of the week, a gotoobi day, a weekday/holiday, long-term consecutive holidays, a school-off duration, and weather. In the operating screen in FIG. 1, the date input field 101 and the day-factors input field 201 are used in such a manner that these fields are switched in a mutually exclusive manner by tab-type interfaces. In the present embodiment, the day-factors input field 201 includes a "weekday/holiday" input field 202, a "season" input field 203, and a "weather" input field 204. Items included within each field are selected in a mutually exclusive manner. For example, in the category of the "weekday/holiday" input field 202, the items "weekday", "holiday•festival", and "consecutive holidays" are mutually exclusive. Namely, only one of them can be selected as the day factor of the prediction-target day. In the example in FIG. 2, this exclusive selection is implemented by radio-button type interfaces. In the drawing, ○ indicates selectable items, and ◉ indicates items which have been actually selected.

On the other hand, the respective fields are not mutually exclusive. Namely, day factors can be expressed by combining items selected within the respective fields. In the example in FIG. 2, "weekday", "spring", and "rain" are selected from the "weekday/holiday" input field 202, the "season" input field 203, and the "weather" input field 204, respectively. Then, under a combination of these items, i.e., a combination of the day factors of "weekday∧spring∧rain", prediction on the traffic information will be performed.

Also, the day factors "gotoobi day" and "school-off duration" existing in a "the others" input field 205 are day factors which are not mutually exclusive. In the example in FIG. 2, these day factors are specified by check-box type interfaces. The day factors existing in the "the others" input field 205 can be selected simultaneously with the day factors existing in any other input field. For example, in the example in FIG. 2, if both of "gotoobi day" and "school-off duration" have been selected, prediction on the traffic information will be performed under a combination of the day factors of "weekday spring∧rain∧gotoobi day∧school-off duration" as a result of the addition with the day factors selected in the fields 201 to 203. Incidentally, the day factor like weather which is independent of the date can also be inputted simultaneously with the date as is indicated in the date input field 101.

Figure 3:
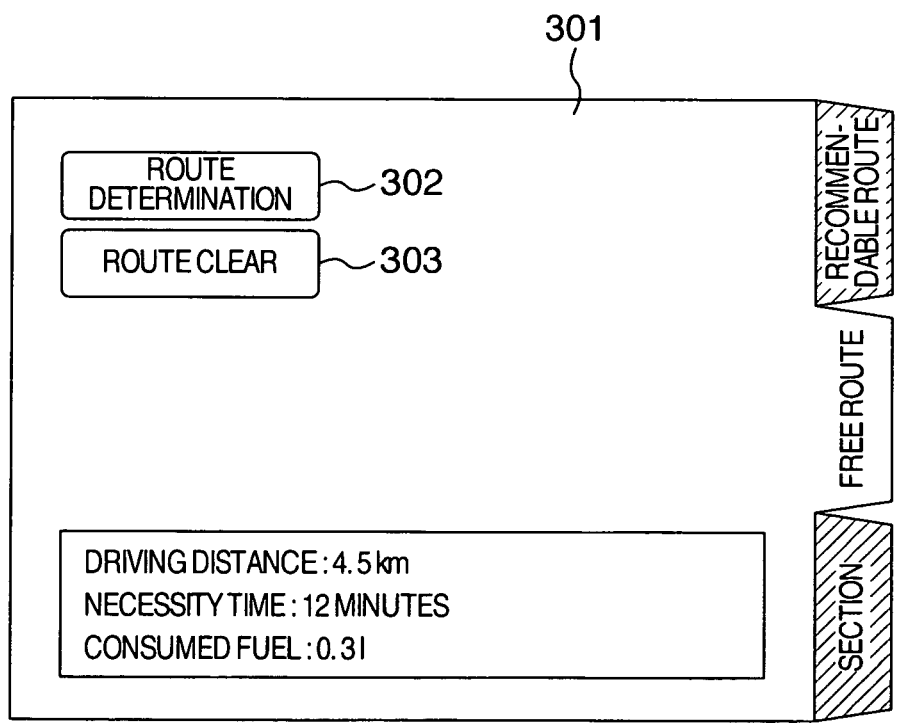
FIG. 3 illustrates an example of a free-route input field in the operating screen of the traffic-information prediction system.

In the example in FIG. 1, the departure place and the destination place are specified in the recommendable-route input field 102. Moreover, the prediction-target route is automatically set using the route search algorithm. In substitution therefor, however, the user can also specify the prediction-target route freely by using a free-route input field 301 illustrated in FIG. 3. At that time, the user selects a link on the map display field 103 so as to input the prediction-target route, then selecting a route determination button 302. This operation allows determination of the prediction-target route. When redoing the input of the prediction-target route, the user selects a route clear button 303.

Figure 4:
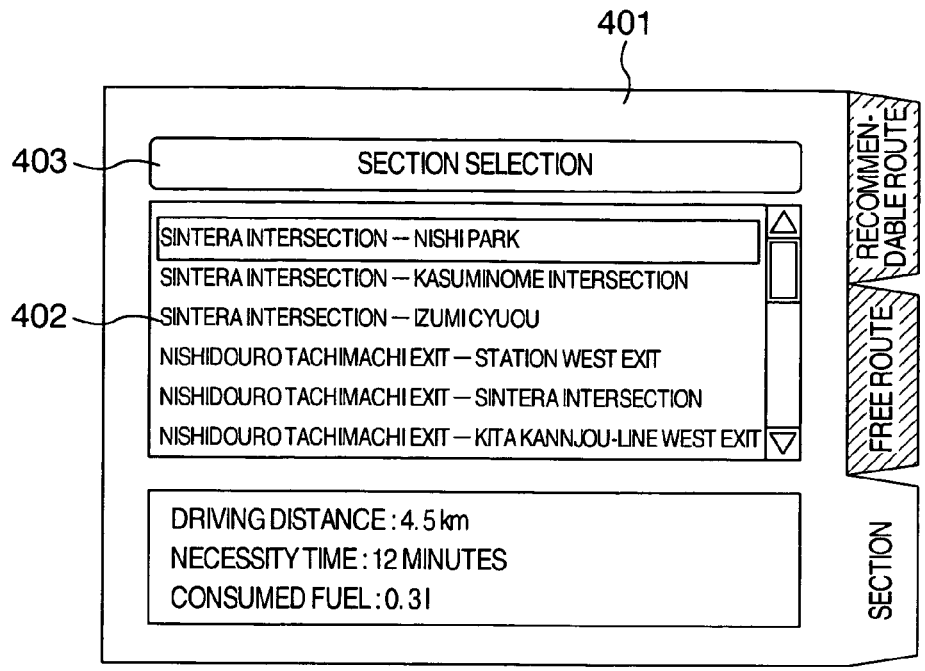
FIG. 4 illustrates an example of a section input field in the operating screen of the traffic-information prediction system.

Also, if a section input field 401 illustrated in FIG. 4 is used, the prediction on the traffic information becomes executable using sections prepared in advance on the traffic-information prediction system side. A section list 402 is a list represented by section names. A section is selected from the section list 402, then selecting a section selection button 403. This operation allows determination of the section which becomes the prediction target, thereby making it possible to display the prediction-target route on the map display field 103. In the operating screen in FIG. 1, the recommendable-route input field, the free-route input field, and the section input field are used in such a manner that these fields are switched in a mutually exclusive manner by the tab-type interfaces.

Figure 2:
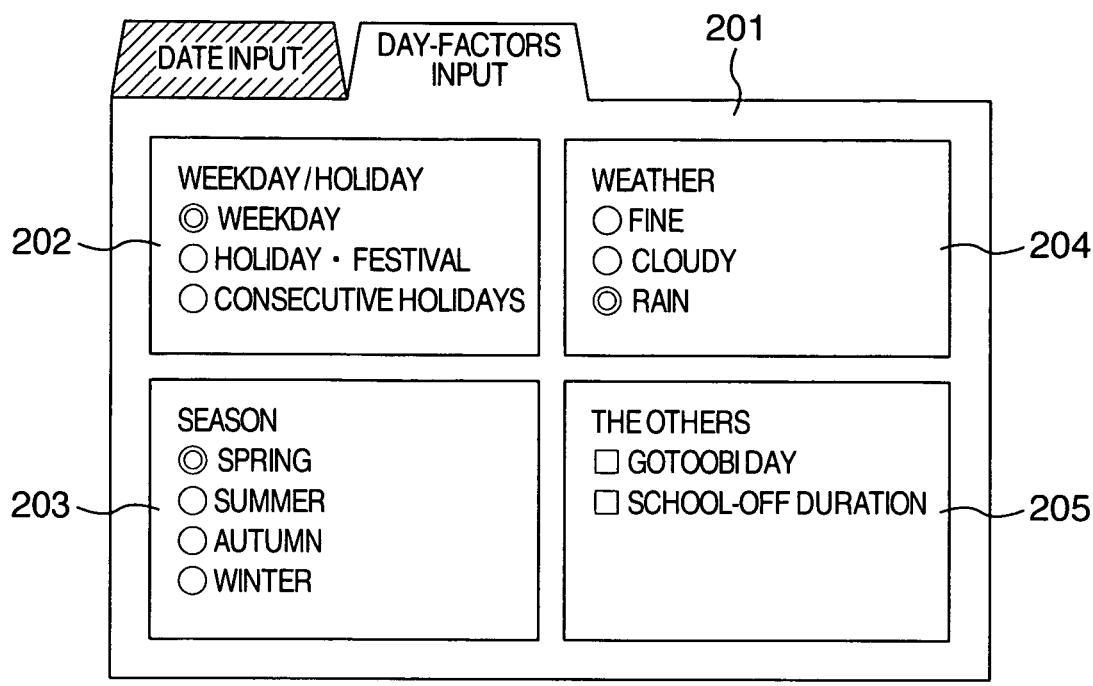
FIG. 2 illustrates an example of a day-factors input field in the operating screen of the traffic-information prediction system.
Figure 5:
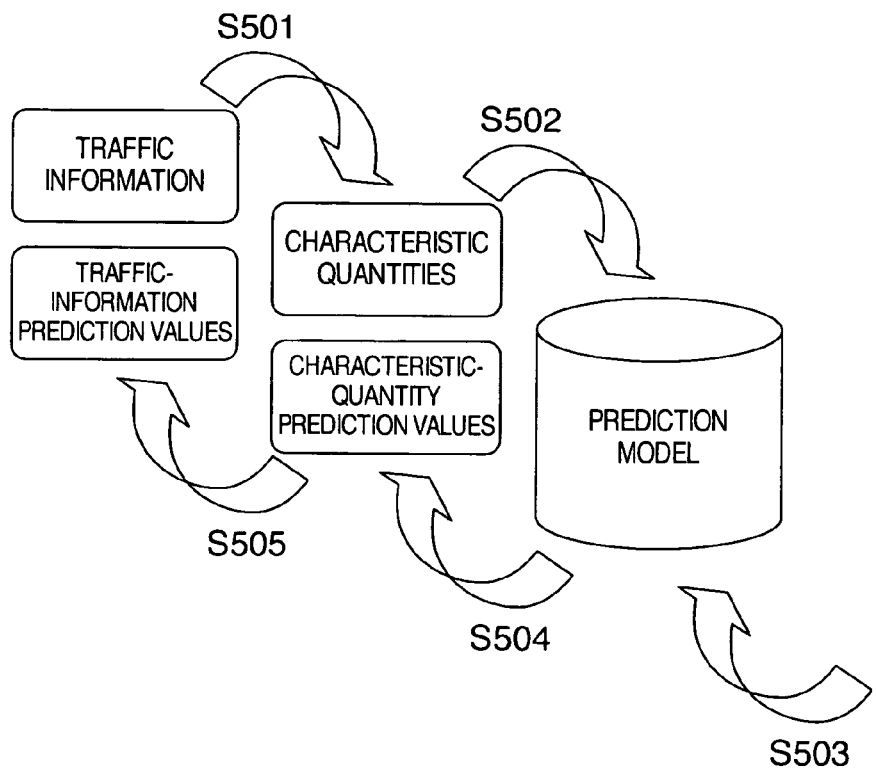
FIG. 5 is a conceptual drawing of a prediction methodology needed for the traffic-information prediction system.

FIG. 5 is a conceptual drawing of a prediction methodology needed for the traffic-information prediction system. Under a combination of arbitrary day factors as illustrated in FIG. 1 and FIG. 2, when trying to perform the prediction on the traffic information which is not defined on a day-unit basis (i.e., 24-hour unit) such as 1-hour unit, 10-minute unit, and 1-minute unit, the conventional prediction methodologies, such as the regression analysis in which day factors are selected as explanatory variable quantities or the day-factors classification, find it impossible to accomplish this purpose. Accordingly, at S501 in FIG. 5, plural basis components and plural characteristic quantities on a day-unit basis are calculated from plural pieces of past traffic-information time-sequence data acquired and accumulated by reception of VICS information and information collection by a probe car. Here, a linear summation of the plural basis components makes it possible to approximately merge these pieces of past traffic-information time-sequence data on each day-amount basis. Also, the characteristic quantities on the day-unit basis are applied to the respective basis components as coefficients when these pieces of past traffic-information time-sequence data are merged from the plural basis components. Moreover, at S502, prediction coefficients in a prediction model are determined. Here, the prediction model represents the characteristic quantities as functions of plural day factors.

In the present system, the way of thinking that the traffic-information time-sequence data is represented using the basis components and the characteristic quantities is established based on the concept that arbitrary time-sequence data can be approximately expressed as a merged value resulting from merging plural orthogonal functions. Fourier transformation, which is the methodology for signal processing, expresses an arbitrary signal as a merged waveform resulting from merging plural trigonometric functions with different periods. What are referred to as the basis components and the characteristic quantities in the present application are equivalent to the trigonometric functions in Fourier transformation and coefficients applied to the respective trigonometric functions when the plural trigonometric functions are linearly merged.

Also, in the present system, the way of thinking that the characteristic quantities are predicted in the manner of being made related with the day factors is established based on an empirical rule that basically the same cause brings about basically the same result. Mentioning conceptual equivalences thereto, this way of thinking is something like weather forecast or technical analysis of a stock price. For example, if a weather forecast says that there will be a 10% precipitation probability for tomorrow, this weather forecast is based on the following way of thinking: Namely, a comparison is made between the weather map of today and a weather map in the past which looks like the weather map of today. Then, from the weather map in the past which looks like the weather map of today, it is found that the relative frequency with which it would rain the next day is equal to about 0.10. Accordingly, the system of weather forecast is based on the way of thinking similar to that of the present system. Moreover, a system as will be described below is also based on a way of thinking similar to that of the present system. Namely, from transition of a stock price in the past, if it is found that the relative frequency with which the stock price is going to rise in a predetermined time-period from the next day is equal to 0.90 or more, a buy sign will be issued. What are referred to as the characteristic quantities and prediction values of the characteristic quantities in the present application are easy to understand if these quantities and values are considered to be PER, RSI, or Bollinger Band.

When the prediction execution button 108 is selected in FIG. 1, consider a case where the prediction on the traffic information is performed using the prediction model as described above. Implementing this case necessitates the following further steps: Namely, at S503, the day-factors information is inputted into the prediction model. Next, at S504, the prediction values of the characteristic quantities are calculated using the prediction model. Moreover, at S505, the basis components calculated at S501 are merged as traffic information with these characteristic-quantity prediction values used as the coefficients. These further steps make it possible to acquire time-sequence data on traffic-information prediction values. In this way, the characteristic quantities on the day-unit basis are prediction-calculated as the functions of the day factors, and the resultant characteristic-quantity prediction values thus calculated are converted into the traffic information. This processing permits traffic information with an arbitrary period to be prediction-calculated under a combination of arbitrary day factors. Consequently, using an interface such as the day-factors input field 201 illustrated in FIG. 2, it becomes possible to provide the prediction values of the time-sequence data such as travel time and congestion level in such presentation manners as the travel-time prediction graph 110 illustrated in FIG. 1.

Figure 6:
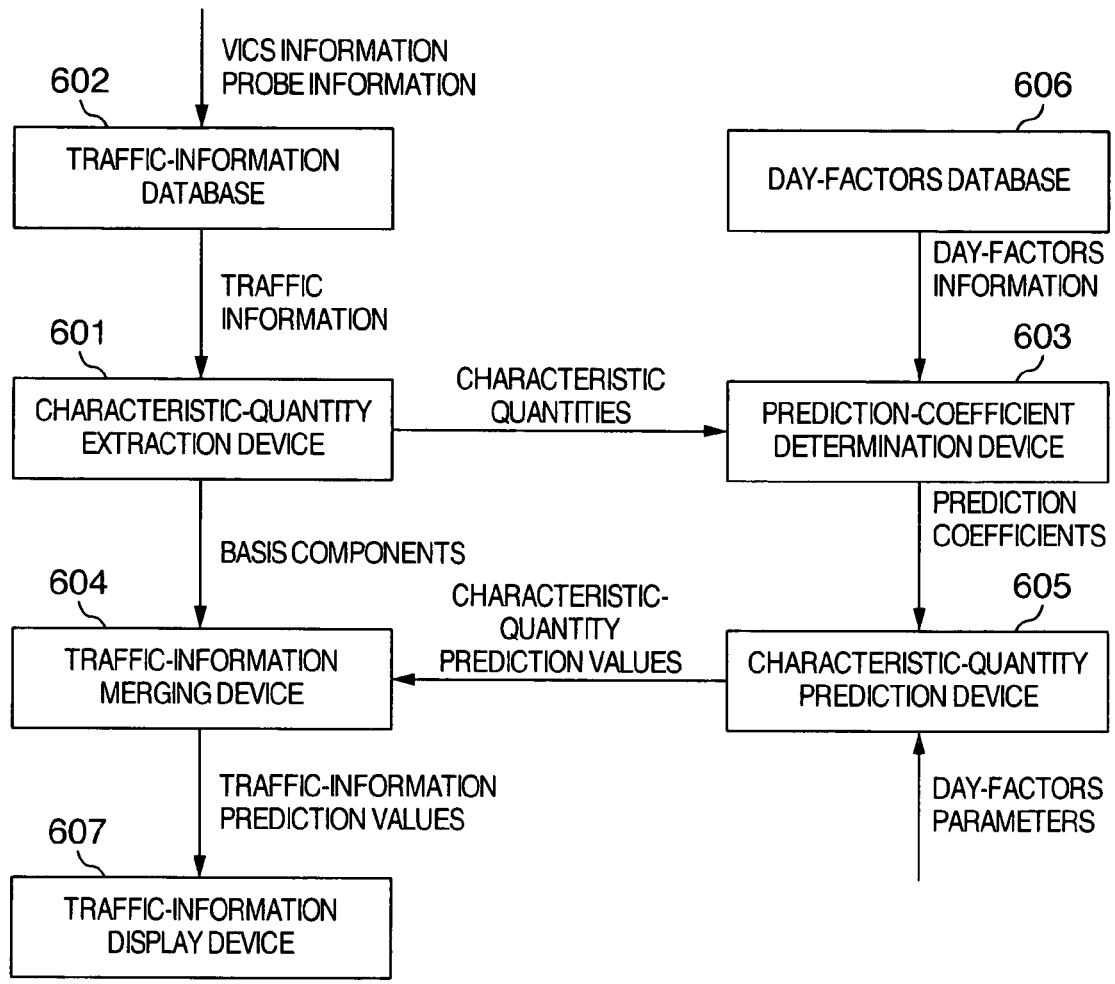
FIG. 6 is a block drawing for illustrating the traffic-information prediction system.

FIG. 6 is a block drawing for illustrating an embodiment of the traffic-information prediction system which is equipped with the prediction methodology whose conception has been indicated in FIG. 5. A characteristic-quantity extraction device 601 calculates the basis components and the characteristic quantities on the day-unit basis as follows: Namely, from past traffic-information time-sequence data such as travel time, congestion level, and traffic volume, i.e., data acquired by reception of VICS information and information collection by a probe car, and accumulated in a traffic-information database (hereinafter, referred to as "DB") 602, the device 601 calculates the basis components and the characteristic quantities, using a methodology such as the principal-component analysis. The basis components, which are needed for merging the original traffic information with the characteristic quantities used as coefficients, are acquired in plural number. A linear summation of the plural basis components makes it possible to approximately merge these pieces of traffic information on each day-amount basis. Moreover, the characteristic quantities, which are also acquired in plural number, are applied to the respective basis components as the coefficients when these pieces of traffic information are merged from the plural basis components. At this time, the characteristic-quantity extraction device 601 outputs the characteristic quantities to a prediction-coefficient determination device 603, and outputs the basis components to a traffic-information merging device 604. Eventually, the above-described processing is as follows: The basis components and the characteristic quantities are calculated from the traffic information, then being respectively outputted to the traffic-information merging device and the prediction-coefficient determination device. This processing is equivalent to the processing at S501 in FIG. 5.

When the principal-component analysis is used for calculating the characteristic quantities, the basis components are uniquely calculated simultaneously with the characteristic quantities. Meanwhile, it is also possible to calculate the characteristic quantities by specifying mutually orthogonal plural functions as the basis components in advance. Fourier transformation is one example of this type of calculation methodologies. When Fourier transformation is used for calculating the characteristic quantities, plural trigonometric functions with different periods are employed as the basis components.

The prediction-coefficient determination device 603, using a methodology such as the regression analysis, calculates prediction coefficients from the characteristic quantities inputted from the characteristic-quantity extraction device 601 and day-factors information on a time-period which becomes target of the above-described characteristic-quantity calculation in the characteristic-quantity extraction device 601. These prediction coefficients are used for a characteristic-quantity prediction device 605 to calculate prediction values of the above-described characteristic quantities on the day-unit basis by using a prediction model where the day factors are selected as parameters. The prediction coefficients thus calculated are recorded into the characteristic-quantity prediction device 605. Incidentally, the above-described day-factors information, which is recorded in a day-factors DB 606, refers to items such as a day of the week, a gotoobi day, a weekday/holiday, long-term consecutive holidays, a school-off duration, and weather. The above-described processing, where the prediction coefficients are calculated in the prediction-coefficient determination device 603, is equivalent to the processing at S502 in FIG. 5.

When the regression analysis is used for calculating the prediction values of the characteristic quantities, function form of the prediction model is a linear summation of day factors. Namely, using 2-value explanatory variable quantities d1, d2, ..., dN indicating whether or not the variable quantities correspond to N types of day factors by 1 or 0 respectively, and the prediction coefficients a1, a2, ..., aN, a characteristic quantity T, i.e., the prediction target, is represented as:

$$T = a1 \times d1 + a2 \times d2 + \ldots + aN \times dN.$$

Meanwhile, when causing numerical data, e.g., temperature or precipitation quantity, to be reflected on the prediction model, terms of multi-value explanatory variable quantities x1, x2, ..., xM are added to the above-described expression, thereby using a prediction model which is represented as:

$$T = a1 \times d1 + a2 \times d2 + \ldots + aN \times dN + b1 \times x1 + b2 \times x2 + \ldots + bM \times xM.$$

Although, in the above-described expression, the terms of the multi-value explanatory variable quantities are defined as first-degree terms, a prediction model can be considered which has second-degree terms, third-degree terms, or the like.

When performing prediction on the traffic information, depending on an instance on a prediction-target day, day-factors parameters needed in the prediction model are inputted into the characteristic-quantity prediction device 605. This processing is equivalent to the processing at S503 in FIG. 5. Next, using the day-factors parameters inputted by a user and the prediction coefficients inputted and recorded from the prediction-coefficient determination device 603, the characteristic-quantity prediction device 605 calculates the characteristic-quantity prediction values, then outputting the characteristic-quantity prediction values to a traffic-information merging device 604. This processing is equivalent to the processing at S504 in FIG. 5. The traffic-information merging device 604 performs the following calculation: Namely, the basis components inputted and recorded from the characteristic-quantity extraction device 601 are merged with the above-described characteristic-quantity prediction values used as the coefficients. This processing is equivalent to the processing at S505 in FIG. 5. These merged values are prediction values of the traffic information corresponding to the day-factors parameters inputted into the characteristic-quantity prediction device 605. Then, the prediction values of the traffic information are outputted to a traffic-information display device 607. Incidentally, although, in FIG. 6, the prediction values of the traffic information have been outputted to the traffic-information display device 607, the predicted traffic information is also usable as input for a route search unit in a car navigation device, or input for a vehicle-allocation project unit in a vehicle-allocation management system.

Figure 12:
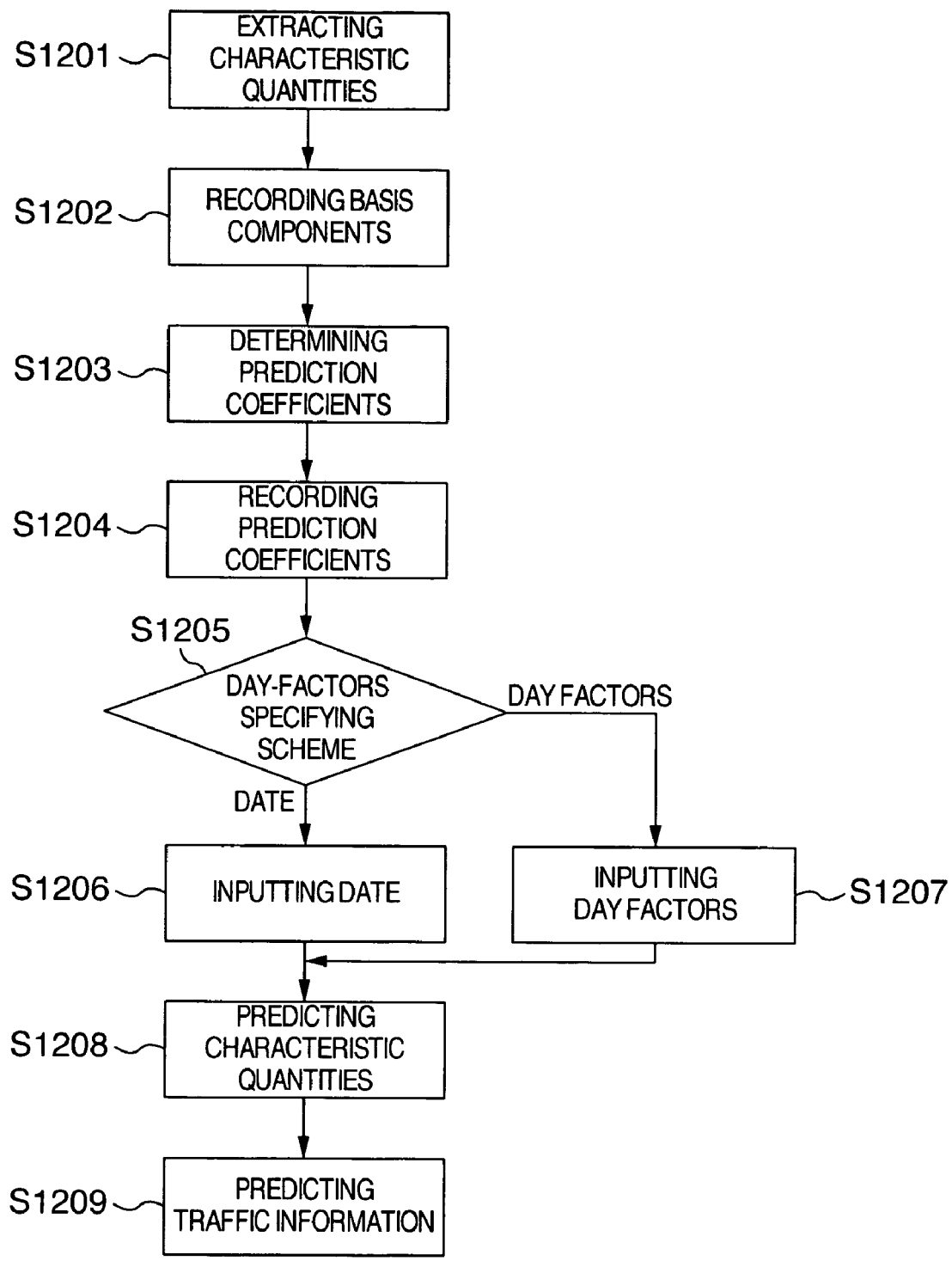
FIG. 12 illustrates an example of a processing flow for predicting traffic information.

FIG. 12 illustrates a processing flow for predicting the traffic information. Hereinafter, in accordance with the embodiment in FIG. 6, the explanation will be given below concerning the processing flow in FIG. 12.

S1201: In the characteristic-quantity extraction device 601, from the plural pieces of past traffic information accumulated in the traffic-information DB 602, the above-described basis components, which make it possible to approximately merge these pieces of traffic information, and the above-described characteristic quantities, which are applied to the basis components as the coefficients when the original traffic information are merged from the basis components, are calculated.

S1202: The basis components calculated at S1201 are recorded into the traffic-information merging device 604.

S1203: In the prediction-coefficient determination device 603, the prediction coefficients are calculated from the characteristic quantities calculated at S1201 and the day-factors information read out from the day-factors DB 606. Here, the prediction coefficients are used for calculating the prediction values of the characteristic quantities by using the prediction model where the day factors are selected as the parameters.

S1204: The prediction coefficients calculated at S1203 are recorded into the characteristic-quantity prediction device 605.

S1205: When predicting traffic information on a specific day, the processing proceeds to S1206. Also, when predicting traffic information with an instance specified, the processing proceeds to S1207.

S1206: A date input device 801 receives input of date of a prediction-target day. Next, day-factors information on the prediction-target day is read out from a day-factors schedule DB 802, and from a weather-forecast DB 804 if information on the weather is needed. Moreover, this day-factors information is inputted into the characteristic-quantity prediction device 605.

S1207: A day-factors input device 805 receives input of day-factors information indicating an instance which becomes the prediction target. Next, this day-factors information is inputted into the characteristic-quantity prediction device 605.

S1208: In the characteristic-quantity prediction device 605, from the day-factors information inputted at S1206 or S1207, the prediction values of the characteristic quantities corresponding to the instance on the day which becomes the prediction target are calculated using the prediction coefficients recorded at S1204.

S1209: In the traffic-information merging device 604, from the characteristic-quantity prediction values calculated at S1208, the prediction values of the traffic information are calculated using the basis components recorded at S1202.

Figure 7:
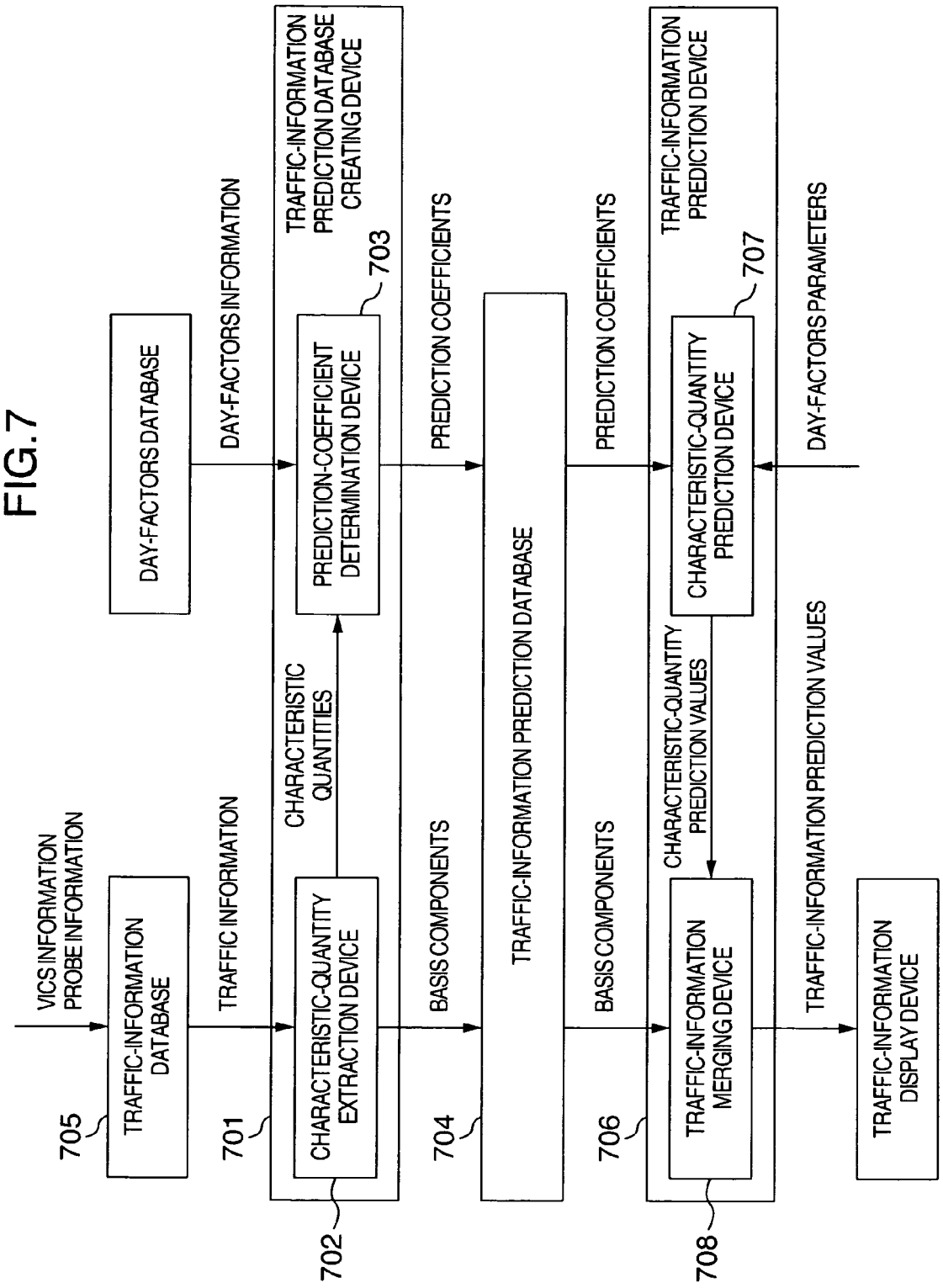
FIG. 7 is a block drawing for illustrating the traffic-information prediction system.

In the traffic-information prediction system according to the embodiment in FIG. 6, the steps ranging from the extraction of the characteristic quantities to the prediction on the traffic information have been dealt with as a series of processings. As illustrated in FIG. 7, however, the steps can also be carried out asynchronously by being divided into a processing of creating in advance a DB needed for the prediction and a processing of performing the calculations for each prediction. The characteristic-quantity extraction device 601 and the prediction-coefficient determination device 603 illustrated in FIG. 6 configure a traffic-information prediction DB creating device 701 in an embodiment in FIG. 7. The basis components and the prediction coefficients, which are calculated in a characteristic-quantity extraction device 702 and a prediction-coefficient determination device 703 respectively, are recorded into a traffic-information prediction DB 704. The above-described processing, where the basis components and the prediction coefficients are calculated from the traffic-information time-sequence data in the traffic-information prediction DB creating device 701 so as to be recorded into the traffic-information prediction DB 704, can be carried out in advance in the manner of being distinguished from the calculation processing which becomes necessary for each prediction. Updating the basis components and the prediction coefficients, which have been recorded into the traffic-information prediction DB 704 by this processing, becomes necessary when the traffic information within a traffic-information DB 705 to be used for the prediction are updated, or when the prediction model itself is changed.

The characteristic-quantity prediction device 605 and the traffic-information merging device 604, which are used in the processes of predicting the traffic information in FIG. 6, configure a traffic-information prediction device 706 in the embodiment in FIG. 7. The traffic-information prediction device 706, if day-factors parameters are inputted therein, passes the parameters over to a characteristic-quantity prediction device 707. Furthermore, the characteristic-quantity prediction device 707 and a traffic-information merging device 708 read out the prediction coefficients and the basis components respectively from the traffic-information prediction DB 704, then outputting the prediction values of the traffic information corresponding to the day-factors parameters. The above-described processing, where the prediction values of the traffic information are calculated from the day-factors parameters in the traffic-information prediction device 706, is a processing which becomes necessary for each execution of the prediction on the traffic information with respect to different day-factors parameters.

Referring to FIG. 12, the supplementary explanation will be given below concerning the processing flow for predicting the traffic information. Namely, in the embodiment in FIG. 7, in comparison with the processing flow according to the above-described embodiment in FIG. 6, the recording of the basis components and that of the prediction coefficients at S1202 and S1204 respectively are performed into the traffic-information prediction DB 704. In addition, at S1208 and S1209, the reading-out of the basis components and that of the prediction coefficients are performed from the traffic-information prediction DB 704.

Figure 8:
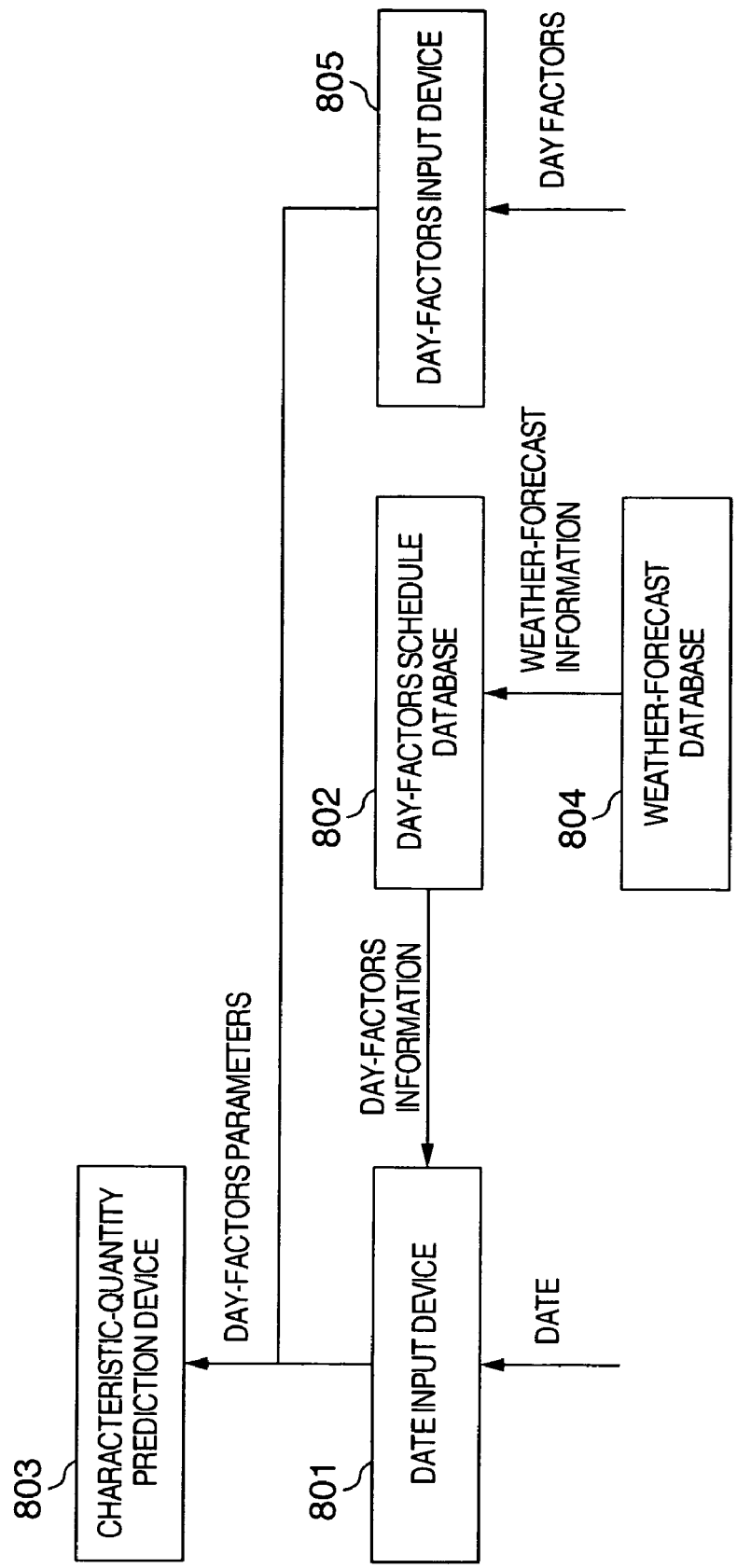
FIG. 8 is a block drawing for illustrating units for inputting dates and day factors.

FIG. 8, which illustrates an input example of the day-factors parameters, is a block drawing for illustrating units for inputting the day factors in the embodiments in FIG. 6 and FIG. 7. In the date input device 801, in response to a date inputted by the user via the operating screen exemplified in FIG. 1, day-factors information on the corresponding date are read out from the day-factors schedule DB 802 for storing day-factors information in the future, then being outputted to the characteristic-quantity prediction device 803 illustrated in FIG. 6 or FIG. 7. At this time, the characteristic-quantity prediction device 803 performs the prediction calculation where even weather information is used as one of the day-factors parameters. Simultaneously, if, as the weather information, weather-forecast information is employed instead of a weather specified by the user, the weather-forecast information on the corresponding date is read out from the weather-forecast DB 804 into the day-factors schedule DB 802. Then, the weather-forecast information is outputted to the characteristic-quantity prediction device 803 along with the other day-factors information.

In the day-factors input device 805, the user finds it possible to perform the prediction calculation of the traffic information by freely combining the day factors, such as a day of the week, a gotoobi day, a weekday/holiday, long-term consecutive holidays, a school-off duration, and weather, via the operating screen exemplified in FIG. 2, and by inputting the resultant combination into the characteristic-quantity prediction device 803. Incidentally, the day factors displayed on the operating screen for day-factors selection are not limited to the embodiment in FIG. 2. This is because the day factors are configured in accordance with day-factors parameters needed for a prediction model in the prediction on the traffic information.

In FIG. 8, it has been assumed that the user will input the date or the day factors. It is preferable enough, however, that programs configuring a car navigation device, a vehicle-allocation management system, or the like will automatically input the date or the day factors into the date input device 801 or the day-factors input device 805.

Figure 9:
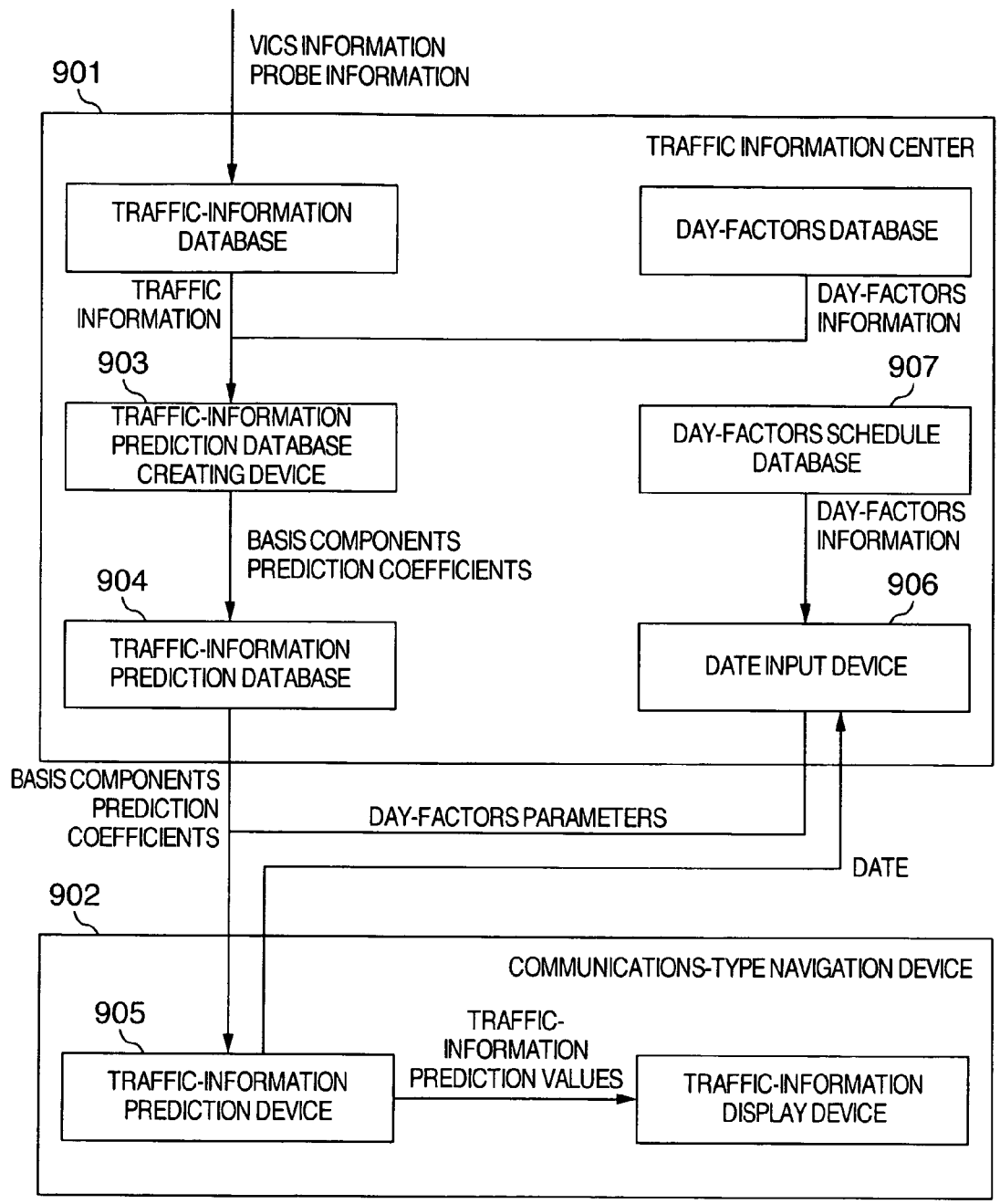
FIG. 9 is a block drawing for illustrating an embodiment where the prediction system is applied to a communications-type navigation device and a traffic information center.

FIG. 9 is a block drawing for illustrating an embodiment where, regarding provision of the traffic information, the prediction system is applied to a communications-type navigation device and a traffic information center. According to the traffic-information prediction system of the present application, the prediction on the traffic information is as follows: Namely, the prediction calculation of the traffic information is executable from the day-factors parameters, the prediction coefficients of the characteristic quantities, and the basis components of the traffic information illustrated in FIG. 6 and FIG. 7. Here, information amount of the prediction coefficients of the characteristic quantities and that of the basis components of the traffic information are smaller than information amount of the traffic-information prediction values calculated based on these information. Namely, the communications amount can be suppressed down to a small one. Accordingly, the present embodiment can be said to be an embodiment which is preferable when providing the traffic information using communications lines. In the embodiment in FIG. 9, the traffic-information prediction database 704 in FIG. 7 is mounted on a traffic information center 901, and the traffic-information prediction device 706 in FIG. 7 is mounted on a communications-type navigation device 902. As a result of this on-board configuration, information which is needed to be transmitted when providing the predicted traffic information is limited to only the above-described day-factors parameters, prediction coefficients, and basis components in substitution for the traffic-information prediction values themselves.

The traffic-information prediction DB creating device 701 and the traffic-information prediction DB 704 in FIG. 7 are installed in the traffic information center 901. Here, the calculation of the prediction coefficients and the basis components by the traffic-information prediction DB creating device 903, and the recording thereof into the traffic-information prediction DB 904 are carried out asynchronously as a processing which is independent of the provision of the predicted, or forecast, traffic information from the traffic information center 901 to the communications-type navigation device 902. In the communications-type navigation device 902, when performing the prediction calculation of the traffic information, date of a prediction-target day is transmitted to the traffic information center 901. Then, the prediction coefficients, the basis components, and the day-factors parameters corresponding to the date transmitted are received from the traffic information center 901. Next, the traffic-information prediction values are calculated in the traffic-information prediction device 905.

Communications data at the time of providing the predicted traffic information from the traffic information center 901 to the communications-type navigation device 902, in accordance with a communications format in FIG. 10, includes the day-factors parameters, the prediction coefficients, and the basis components on each link or section basis, i.e., unit of the prediction calculation of the traffic information. As illustrated in FIG. 11, however, another communications format can also be given where the information in each prediction link/section are summarized on each information-type-basis such as the day-factors parameters, the prediction coefficients, and the basis components. Namely, as long as the communications format selected is a one which allows the day-factors parameters, the prediction coefficients, and the basis components needed for the prediction calculation by the traffic-information prediction device 905 to be transmitted for each prediction section of the prediction target, its mode is not limited to the formats in FIG. 10 and FIG. 11. Incidentally, when performing the prediction in plural links/sections, there are some cases where the day-factors parameters are identical to each other for each prediction link/section. In such a case, the day-factors parameters need not be transmitted in a manner of being overlapped.

In the embodiment in FIG. 9, the date of a prediction-target day is transmitted from the communications-type navigation device 902 to the traffic information center 901. Then, the day-factors parameters created in the traffic information center 901 via the date input device 801 illustrated in FIG. 8 are sent back to the communications-type navigation device 902. In contrast thereto, the date input device 906 and the day-factors schedule DB 907 located in the traffic information center 901 are mounted on the communications-type navigation device 902. This on-board configuration permits the processing of creating the day-factors parameters from the date to be carried out offline on the side of the communications-type navigation device 902. Otherwise, the day-factors input device 805 is mounted on the communications-type navigation device 902. This on-board configuration permits the day-factors parameters to be directly inputted offline.

At this time, the day-factors parameters are eliminated from the communications formats in FIG. 10 and FIG. 11. Also, the following on-board configuration is possible: Namely, the characteristic-quantity prediction device 707 and the traffic-information merging device 708 which configure the traffic-information prediction device 905 are divided. Then, the former is mounted on the traffic information center 901, and the latter is mounted on the communications-type navigation device 902. In that case, the prediction on the characteristic quantities is carried out in the traffic information center 901. Furthermore, the day-factors parameters and the prediction coefficients are eliminated from the communications formats in FIG. 10 and FIG. 11, and the characteristic-quantity prediction values are added instead. Incidentally, in the embodiment where the date input device 906 and the day-factors schedule DB 907 are mounted on the communications-type navigation device 902, if the traffic-information prediction device 905 also necessitates weather information as one of the day-factors parameters, the weather-forecast DB where the weather-forecast information has been downloaded in advance is mounted on the communications-type navigation device 902. Otherwise, the weather-forecast DB connected to a network is accessed when performing the prediction calculation of the traffic information. These operations allow acquisition of the weather-forecast information on a prediction-target day.

Here, regarding the provision of the traffic information, the prediction system has been applied to the communications-type navigation device. In substitution therefor, the system is also applicable to appliances such as mobile telephone, PDA, and personal computer connected to a network. Also, instead of the provision of the traffic information via communications, when providing the traffic information using recording media such as DVD-ROM, appliances such as navigation device and personal computer can be equipped with the function of the traffic-information prediction device 706 in FIG. 7. Naturally, at that time as well, the information to be recorded into the recording media can be limited to only the prediction coefficients, basis components, and day-factors parameters on each link/section basis, i.e., only the information stored in the traffic-information prediction DB 904 and the day-factors schedule DB 907. This allows implementation of a decrease in the information amount similarly to the above-described case, thereby making it possible to reduce a load on a storage device as compared with the traffic-information prediction values themselves.

In the present traffic-information prediction system, the numerical traffic information which is not defined on a day-unit basis, such as the travel time with a several-minute interval, is predicted in such a manner that day factors and the like are reflected thereon. Even if a day whose instance is the same as that of a prediction-target day does not exist within a time-period during which the past traffic information has been accumulated, the past traffic information are merged. This merging makes it possible to accurately predict traffic information under a desired instance.

Embodiment 2

Hereinafter, referring to FIG. 13 to FIG. 19, the explanation will be given below concerning an embodiment of the present invention, i.e., a traffic-information prediction system including a day-factors classification setting unit. In the present embodiment, the traffic-information prediction system in the previously-described embodiment is further equipped with a day-factors classification setting unit. On account of this, a service business for providing the traffic information, or a user finds it possible to originally customize the predicted traffic information by adding therein characteristics of an area or the like.

Figure 13:
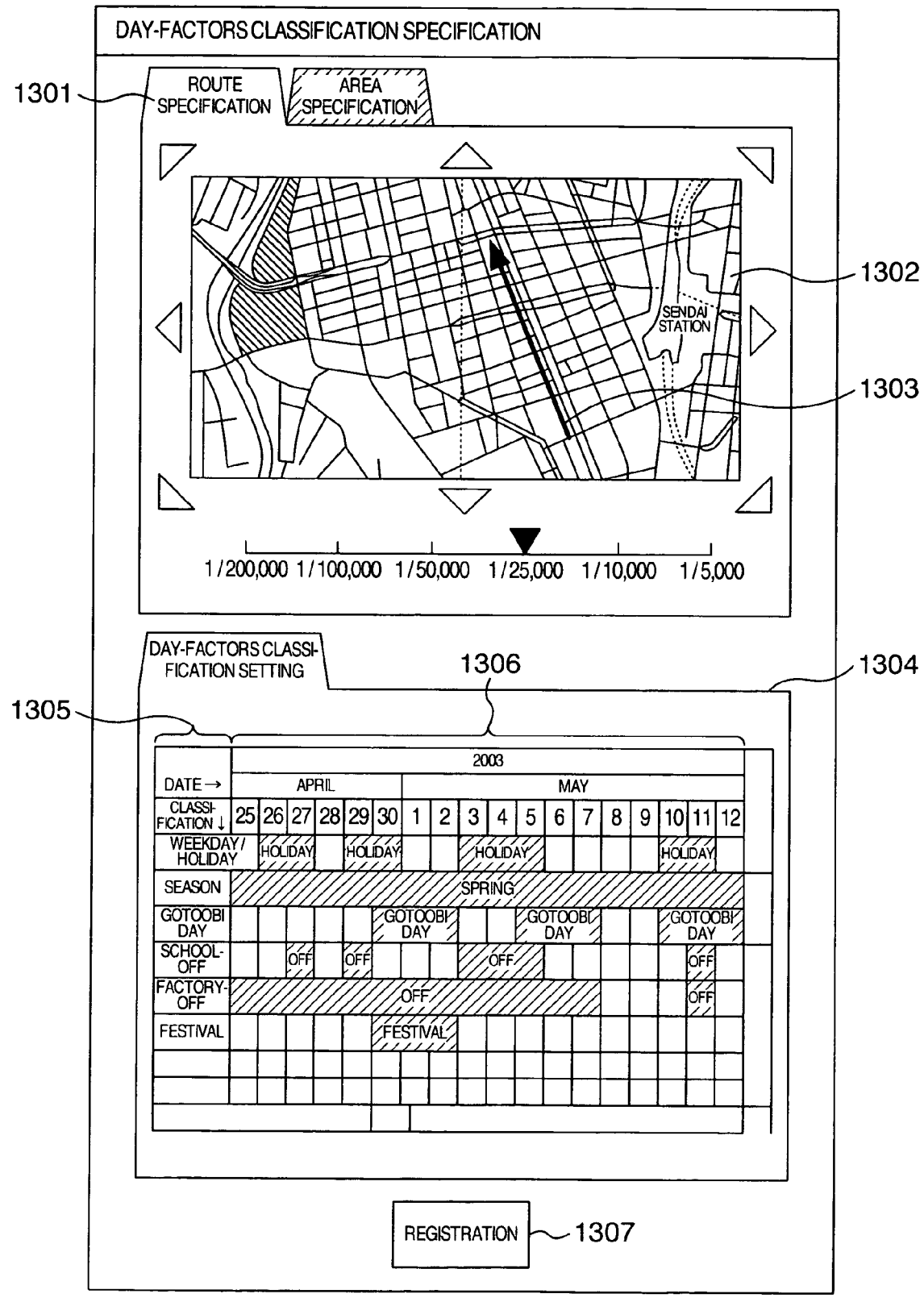
FIG. 13 illustrates an example of a day-factors classification specifying screen in a setting screen of the traffic-information prediction system.

FIG. 13 illustrates a day-factors classification specifying screen in a setting screen by the day-factors classification setting unit of the traffic-information prediction system. In a route specification field 1301, a map is displayed on a map display field 1302 with a scale (of 1:25,000 in the case of FIG. 13) specified by the scale displayed in a lower portion of the region of the route specification field 1301. The user selects a road on the map display field 1302, thereby making it possible to select a route which becomes the target of the day-factors classification as is indicated by an arrow 1303.

In a day-factors classification setting field 1304, a day-factors classification 1305 and a calendar 1306 display a day-factors classification determined in advance on the system side, or a day-factors classification already registered by the user. For example, the explanation will be given selecting, as an example, an item whose day-factors classification is "weekday/holiday". Namely, within a row whose day-factors classification is "weekday/holiday" on the calendar 1306, dates indicated by the darker color or the color different from the paper's color are registered as the day-factors classification of "holiday", and dates other than these dates are registered as the day-factors classification of "weekday".

Here, the explanation will be given below regarding a method for newly registering a day-factors classification on the day-factors classification setting field 1304. First, a day factor which is wished to be newly set is determined at a location which has become a space column in the day-factors classification 1305. Next, a time-period which is to be registered as the day-factors classification is set on the calendar 1306. For example, in an example of registering "festival" in the day-factors classification, the space column in the day-factors classification 1305 is selected to input "festival" therein, then selecting locations from April 30th to May 2nd on the calendar 1306 and registering "festival" therein. Also, plural items are settable within one and the same day-factors classification. For example, considering the day-factors classification of "season", items of "summer", "autumn", and "winter" exist other than "spring" displayed on the calendar 1306. These seasons are also settable on the user side.

Figures 14, 15, 16:
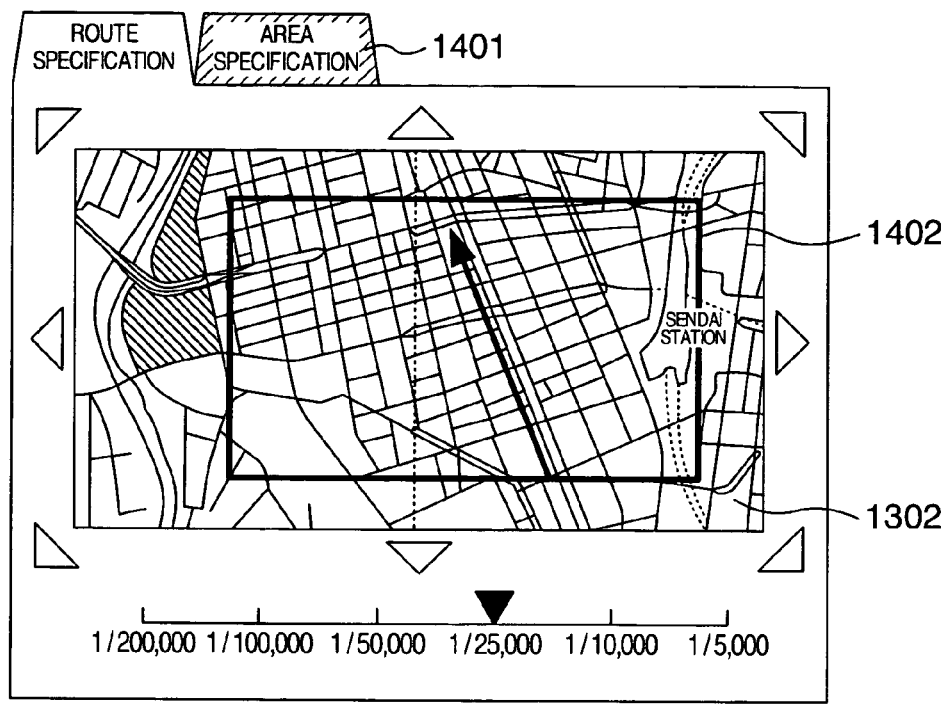
FIG. 14 illustrates an example of an area specifying screen in the setting screen of the traffic-information prediction system.
FIG. 15 illustrates an example of the area specifying screen according to mesh codes in the setting screen of the traffic-information prediction system.
FIG. 16 illustrates an example of the area specifying screen according to administrative districts in the setting screen of the traffic-information prediction system.

FIG. 14 illustrates an area specifying screen in the setting screen by the day-factors classification setting unit of the traffic-information prediction system. In the route specification field 1301 illustrated in FIG. 13, the route has been specified. In substitution therefor, an area specification field 1401 is a screen on which an area is specified thereby to specify a road link which becomes the target of the day-factors specified classification. In the area specification field 1401, the map display field 1302 is displayed. The user specifies the area with a rectangle 1402 on this map display field 1302, thereby selecting in batch the road link that the user wishes to employ as the target of the day-factors classification. In addition to the area specification method illustrated in FIG. 14, i.e., the method of directly specifying the area on the map, the following area specification methods are also usable: Namely, an area specification method as illustrated in FIG. 15 where mesh codes will be selected, and an area specification method as illustrated in FIG. 16 where administrative districts will be selected.

An example illustrated in FIG. 15 indicates that mesh codes 1502 specified out of a mesh-code list 1501 correspond to an area which is to be employed as the day-factors classification target. In this case, it turns out that a road link included within the area corresponding to the specified mesh codes 1502 has been selected as the day-factors classification target. Incidentally, as the mesh codes, codes such as area mesh codes, which are indicated in, e.g., JIS X 0410:1976, will be used.

In FIG. 16, a day-factors classification target region is selected by specifying administrative districts sequentially, just as selection regions 1604, 1605, and 1606 from a Japan's 47-prefecture selection box 1601, a municipality selection box 1602, and a town-name selection box 1603. An example in FIG. 16 indicates that "Omika-cho Hitachi-shi Ibaragi Prefecture" has been selected as the day-factors classification target region. These selection boxes 1601, 1602, and 1603 are hierarchically structured. Namely, for example, municipalities within an administrative district selected in the Japan's 47-prefecture selection box 1601 are displayed in a step-structured manner within the municipality selection box 1602.

Figure 17:
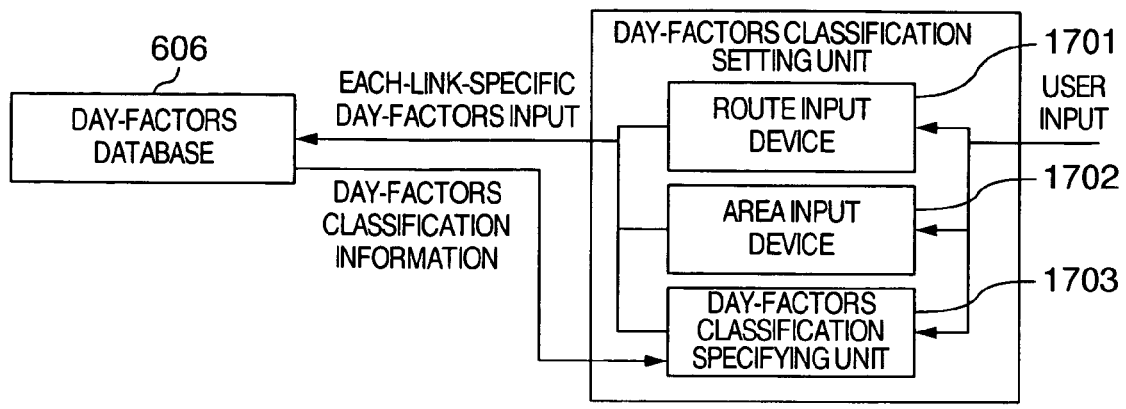
FIG. 17 is a block drawing for illustrating the traffic-information prediction system including a day-factors classification setting unit.

FIG. 17 is a block drawing for illustrating the traffic-information prediction system including the day-factors classification setting unit configured by the screen examples illustrated in FIG. 13 to FIG. 16. An example of the inputting screen of a route input device 1701 corresponds to the route specification field 1301 in FIG. 13. Examples of the inputting screen of an area input device 1702 correspond to the examples of the area selecting screen in FIG. 14, FIG. 15, and FIG. 16. An example of the inputting screen of a day-factors classification specifying unit 1703 corresponds to the day-factors classification setting field 1304. In the route input device 1701, based on map data stored in a map database which is not illustrated, a specified-scale map is displayed on a map display field of the inputting screen. Coordinates of a route specified on this map display field are determined from the map data. This allows a link included in the corresponding road to be extracted as the day-factors classification target link, and allows the arrow 1303 for indicating the selected road to be displayed on the map display field.

In the area input device 1702, based on map data stored in a map database which is not illustrated either, a specified-scale map is displayed on a map display field of the inputting screen. In order to extract, as the day-factors classification target link, a link included in an area specified on this map display field, coordinate positions of the rectangle 1402 specified on the screen are determined from the map data. Moreover, the link of a road is determined which exists within the region of the coordinates specified by the rectangle 1402. Incidentally, when specifying the region by the selection of the mesh codes as is illustrated in FIG. 15, from a table (not illustrated either) indicating mesh-code data for causing the mesh codes and coordinate information corresponding thereto to correspond to each other, coordinates of a region corresponding to selected codes are determined. Furthermore, the link of a road is determined which exists within the region of the coordinates. Also, when specifying the region by the area selection as is illustrated in FIG. 16, in order to display the Japan's 47-prefecture selection box 1601, the municipality selection box 1602, and the town-name selection box 1603, a database is separately prepared beforehand which manages the hierarchy information on the administrative districts and coordinate information on the region on a map corresponding to each administrative district. Then, the coordinate information on the region is determined from the information on the administrative districts displayed and selected in a step-structured manner. Furthermore, the link of a road is determined which exists within the region.

Each day-factors classification determined in the day-factors classification specifying unit 1703 corresponds to the road link or link group which is extracted using at least one of the above-described two input devices. Then, the day-factors database 606 defined on each link basis is formed.

In the day-factors classification specifying unit 1703, registered day-factors classifications and registration time-period or registration items of each day-factors classification are read out from the day-factors database 606, then being displayed on the day-factors classification setting field 1304. In addition, if a day-factors classification has been inputted into the day-factors classification 1305 and the calendar 1306 of the day-factors classification setting field 1304, the day-factors classification data will be updated. This is performed based on a judgment that the new day-factors classification has been added. Also, similarly, if deletion of a selected day-factors classification has been instructed, or if time-period or items of the selected day-factors classification has been changed, the day-factors classification data will also be updated.

In the day-factors classification setting unit, each-link-specific day-factors input data is transmitted to the day-factors database 606, thereby updating the day-factors database 606. Here, the each-link-specific day-factors input data is acquired by causing the day-factors classifications updated in the day-factors classification specifying unit 1703 to correspond to the road link or link group selected in the route input device 1701 or the area input device 1702.

Furthermore, based on the data in the updated day-factors database 606, the prediction-coefficient determination device 603 indicated in the first embodiment performs the prediction-coefficient determination processing at S1203 in FIG. 12. This allows determination of the prediction coefficients on each link basis, thereby making it possible to perform the traffic-information prediction.

On account of the traffic-information prediction system equipped with the day-factors classification setting unit illustrated in FIG. 17, a service business for providing the traffic information or a user finds it possible to originally customize the predicted traffic information by adding therein characteristics of an area or the like. In the traffic-information prediction scheme of the present embodiment, the prediction is performed by separately preparing the basis components calculated by the characteristic-quantity extraction, and the prediction coefficients calculated from the relationship made to establish between the basis components and the day-factors database. Consequently, there exists no necessity for the in-advance classification based on the day-factors. As a result, a manager who is very familiar with the circumstances of an area finds it possible to determine the prediction coefficients such that, to the basis components created beforehand, the manager adds information having a high dependence on each area basis, such as occurrence time-and-date of an event, school-off day, and factory-off day, as the day-factors database after the prediction. As described above, the processing of creating the basis components common to the entire nation and the processing of creating the prediction coefficients specific to each area are separated with each other. This allows implementation of the degree of freedom in customizing the day-factors classification, thereby making it possible to implement an enhancement in the accuracy.

Figure 18:
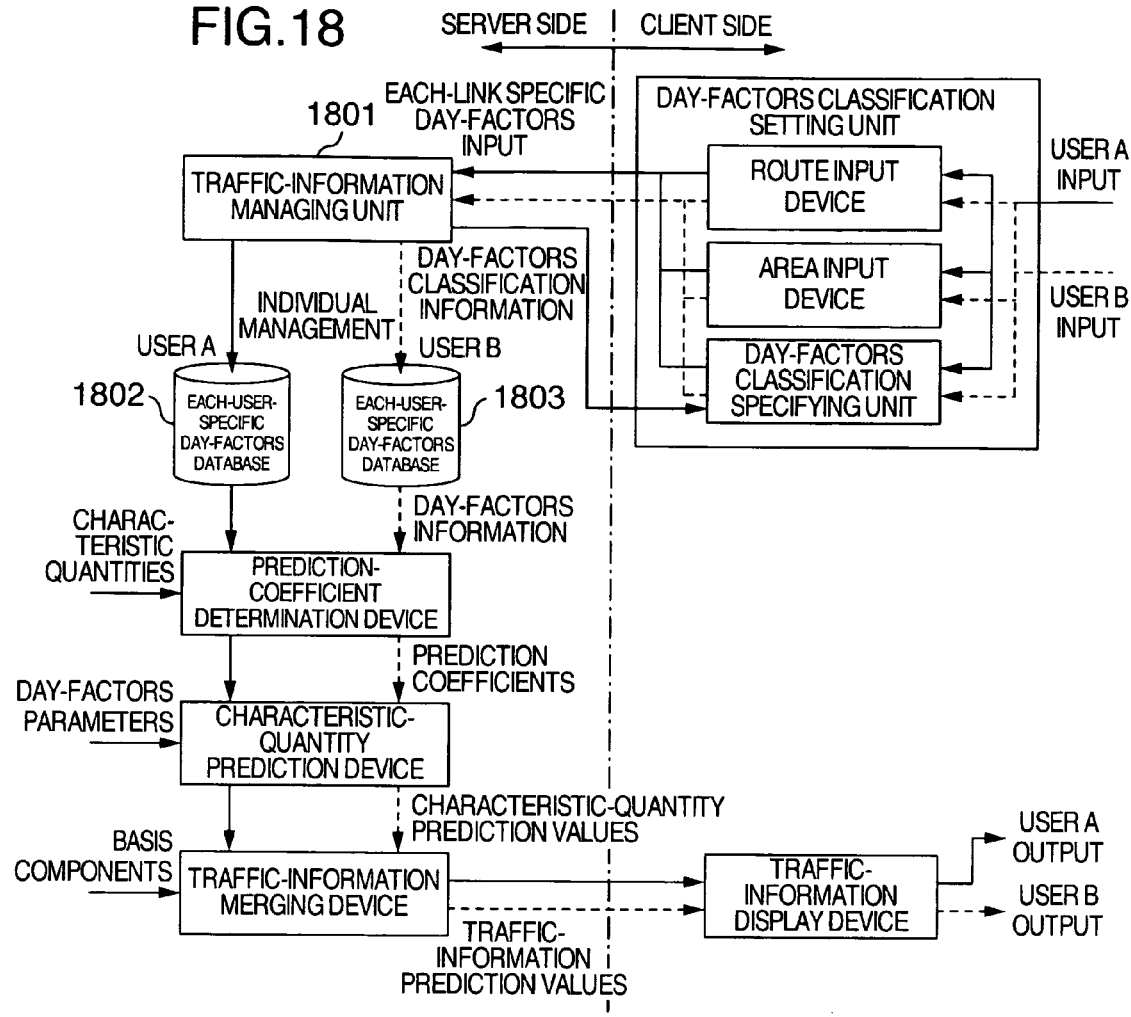
FIG. 18 is a block drawing for illustrating the traffic-information prediction system including a traffic-information managing unit and the day-factors classification setting unit on each-user-basis.

FIG. 18 is a block drawing for illustrating the traffic-information prediction system which, in addition to the day-factors classification setting unit, includes a traffic-information managing unit for managing the day-factors database on each user basis. In an example in FIG. 18, the following server-client-type system configuration is assumed: Namely, a server system on the server side includes the databases such as the traffic-information database and the day-factors database, or performs the processing for the traffic-information prediction. Meanwhile, a client system on the user side transmits, to the server, each-link-specific day-factors input data on each user basis, and outputs the traffic-information prediction result determined on the server side. In the client system on the user side, in response to a request from a user, the day-factors classification information on the above-described user is fetched from the server. Next, similarly to the example described earlier, the day-factors classification specifying screen is displayed. Moreover, based on the input of the day-factors classification data from the above-described user, the each-link-specific day-factors input data is created, then being transmitted to the server. Incidentally, if the day-factors classification information on the user has been managed in the client system as well, the day-factors classification information in the client system may be used without fetching the day-factors classification information on the user from the server. Having received the each-link-specific day-factors input data transmitted on each user basis, a traffic-information managing unit 1801 on the server side, of each-user-specific day-factors databases 1802 and 1803 set on each user basis and managed separately, updates the each-user-specific day-factors database of the above-described user. Moreover, in the server, unlike the example illustrated in FIG. 6, the each-user-specific day-factors databases classified on each user basis will be utilized. Furthermore, regarding the respective processings of prediction-coefficient determination, characteristic-quantity prediction, and traffic-information merging will also be performed in the manner of being classified on each user basis. This allows the user to acquire the specifically-customized predicted traffic information in the traffic-information display device 607 on the client side as well. As described above, the traffic-information prediction device of the present invention is equipped with the traffic-information managing unit for managing the day-factors database on each user basis. This permits the traffic-information prediction device to implement the user-specific customizing as a server-client-type service.

Figure 19:
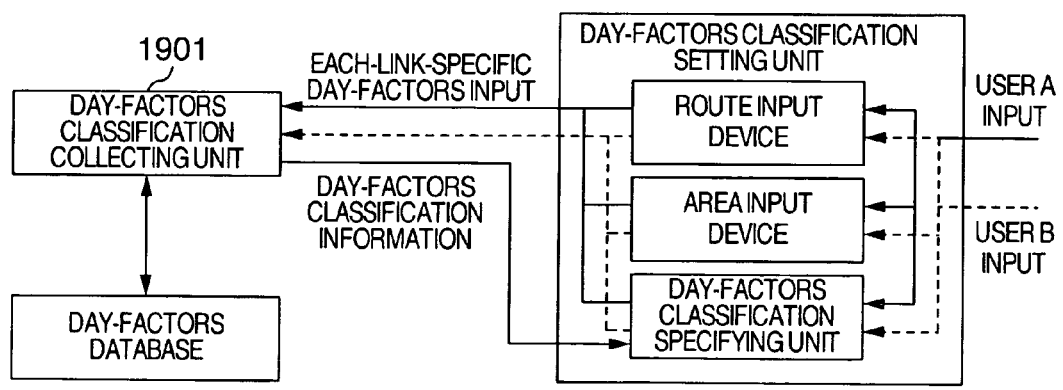
FIG. 19 is a block drawing for illustrating the traffic-information prediction system including a day-factors classification collecting unit and the day-factors classification setting unit.

FIG. 19 is a block drawing for illustrating the traffic-information prediction system including a day-factors classification collecting unit and the day-factors classification setting unit. A day-factors classification collecting unit 1901 is a unit for collecting the day-factors classifications independently inputted on each user basis. For example, consider a case of inputting an instance of annual events (e.g., fireworks display, festival, and field day) for a certain link. For example, based on each-link-specific day-factors inputs independently received from a user A and a user B, the day-factors classification collecting unit 1901 designates classification name defined for an event by the user A as "user A: event", and designates classification name defined for an event by the user B as "user B: event", then registering the classification names into the day-factors database. In the prediction-coefficient determination device, the above-described two classifications are dealt with as classifications independent of each other, and prediction coefficients for the different classifications will be calculated. When calculating traffic-information prediction values, the predicted traffic information will be calculated in a manner of adding therein influences exerted by both of the day-factors classifications.

On account of the traffic-information prediction system equipped with the day-factors classification collecting unit as described above, it becomes possible to enhance the prediction accuracy by taking advantage of the day-factors classifications defined by plural users. In the present invention, the relationship made to establish between the basis components and the day-factors classifications is dealt with as the prediction coefficients. For example, as regards a day-factors classification which is inappropriate as category and whose relationship made to establish with the traffic conditions is small, the prediction coefficients become smaller, and become predictable in a state of being not influenced significantly by the day-factors classification. As regards a day-factors classification which is appropriate as category and whose relationship made to establish with the traffic conditions is large, the prediction coefficients become larger, and become predictable in a state of being influenced significantly by the day-factors classification. Accordingly, the prediction influenced by only the appropriate day-factors classification becomes executable. Consequently, it becomes possible to enhance the prediction accuracy by adding the plural pieces of day-factors classification information.

Embodiment 3

Hereinafter, referring to FIG. 20 to FIG. 23, the explanation will be given below concerning an embodiment of the present invention, i.e., a traffic-information prediction system including a time-delay-risk predicting unit for predicting travel-time delay risk. In the present embodiment, the prediction system equipped with the time-delay-risk predicting unit provides not only prediction value of travel time but also probability that the delay will occur. This characteristic allows the prediction system to be made useful for business-operations at the time of proposing a delivery plan corresponding to load's time-specified delivery or the like.

FIG. 20 illustrates an example of the display screen of time delay risk. A graph 2001 is a graph where the transverse axis denotes travel time (minute unit) and the longitudinal axis denotes occurrence probability of the travel time. The graph 2001 indicates distribution of the travel time predicted in a "○X–ch○→□△ intersection" section at 17:05 on Sep. 20, 2003. For example, a bar graph 2002 indicates that a probability that the travel time falls into necessity-time class value of 120 minutes to 180 minutes is equal to substantially 25%. Also, as shown by line segments 2003, travel times which become expectation value, 80 percentile, and 95 percentile can also be represented on the graph. Here, the percentile represents a ratio at which the travel time becomes lower than a certain predetermined value on the cumulative distribution. The percentile can be calculated as integration of travel-time probability density distribution. In an example in FIG. 20, "80% 320 minutes" indicates that the travel time in this section will fall within 320 minutes with a probability of 80%.

The representation in FIG. 20 makes it possible for a user to recognize the travel-time prediction value. In addition, by seeing the representation where figure of the graph and the line segments in the percentile representation are superimposed on each other, the user finds it possible to visually recognize to what extent there exists a probability that the prediction value will vary. Also, in comparison with a case where a mere representation is given regarding reliability of the predicted expectation value of the travel time, from the graph and the percentile representation, the user soon finds it easy to judge which of tendencies is stronger, i.e., a tendency to delay for the expectation value and a tendency to pass through in a time shorter than the expectation value. This allows the user to evaluate with what extent of time leeway the user should depart at the time of making the travel plan or a delivery plan. The example in FIG. 20 implies that it is all right for the user to depart in expectation of a necessity time of 320 minutes, if an 80-% reliability of being able to arrive in time is satisfying enough, i.e., the circumstances is that the delay is permissible one time within five times. If the reliability of being able to arrive in time is more strict, and if a 95-% reliability is required, i.e., the circumstances is that the delay is permissible only one time within twenty times, the user is required to expect a necessity time of 410 minutes. In creating the travel-time probability distribution in FIG. 20, if a travel-time delay due to occurrence of an accident is contained in the data, it is also possible to calculate a time delay risk which expects the accident occurrence risk.

FIG. 21 illustrates another example of the time-delay-risk display screen. In a delay risk representation 2101, a numeral 2102 denotes an expectation necessity time about the travel time in a specified section based on the traffic-information prediction values calculated from the past traffic-information database similarly to the first embodiment, and a delay risk level estimated from a variation in data on the expectation necessity time. In an example in FIG. 21, in accordance with explanatory notes 2104, a delay risk A indicates that a probability that the delay time falls within 10 minutes is equal to 90%, a delay risk B indicates that a probability that the delay time falls within 30 minutes is equal to 90%, and a delay risk C indicates that a probability that the delay time falls within 60 minutes is equal to 90%. Namely, the above-described example indicates that a probability of being able to arrive within 230 minutes, i.e., total of the 200-minute expectation necessity time and the 30-minute delay time, is equal to 90%. As shown in this example, strong interests on the driver's side are a point of about how long it takes as the necessity time, and a point of about how long the arrival time is likely to delay with reference to the predicted necessity time. On account of this, by representing the time delay risk by using the delay risk level which results from estimating the delay time with reference to the expectation value of the necessity time, the user can know intuitively the degree of occurrence of the time delay risk along a road.

Also, as shown on a table 2103, different necessity times and delay risk levels can be represented depending on time zones. In an example on the table 2103, in a case where the departure point-in-time is 16:00, the necessity time is equal to 120 minutes, and the delay risk level is A. This indicates that it is possible to arrive at the destination in time with a high reliability. In contrast thereto, in a case where the departure point-in-time is 18:00, the necessity time is equal to 300 minutes, and the delay risk level is C. Accordingly, as compared with the case where the departure point-in-time is 16:00, the longer necessity time is required, and further, the delay risk level is higher. This indicates that the reliability of being able to arrive by the expectation necessity time is low, and that the necessity time is considerably likely to be lengthened. By seeing this table, the user can confirm that selecting the case where the departure point-in-time is 16:00 enables the user to arrive at the destination with a much higher certainty. Incidentally, in an explanatory notes 2104 in FIG. 21, the delay risk level is represented by the delay time in the case where the probability becomes equal to a constant value (90% in the example). The level classification, however, may also be performed by making the delay time or delay time ratio (i.e., value acquired by dividing the delay time by the expectation necessity time) constant, and by performing the level classification depending on differences in the probabilities of being able to arrive within the time.

Figure 22:
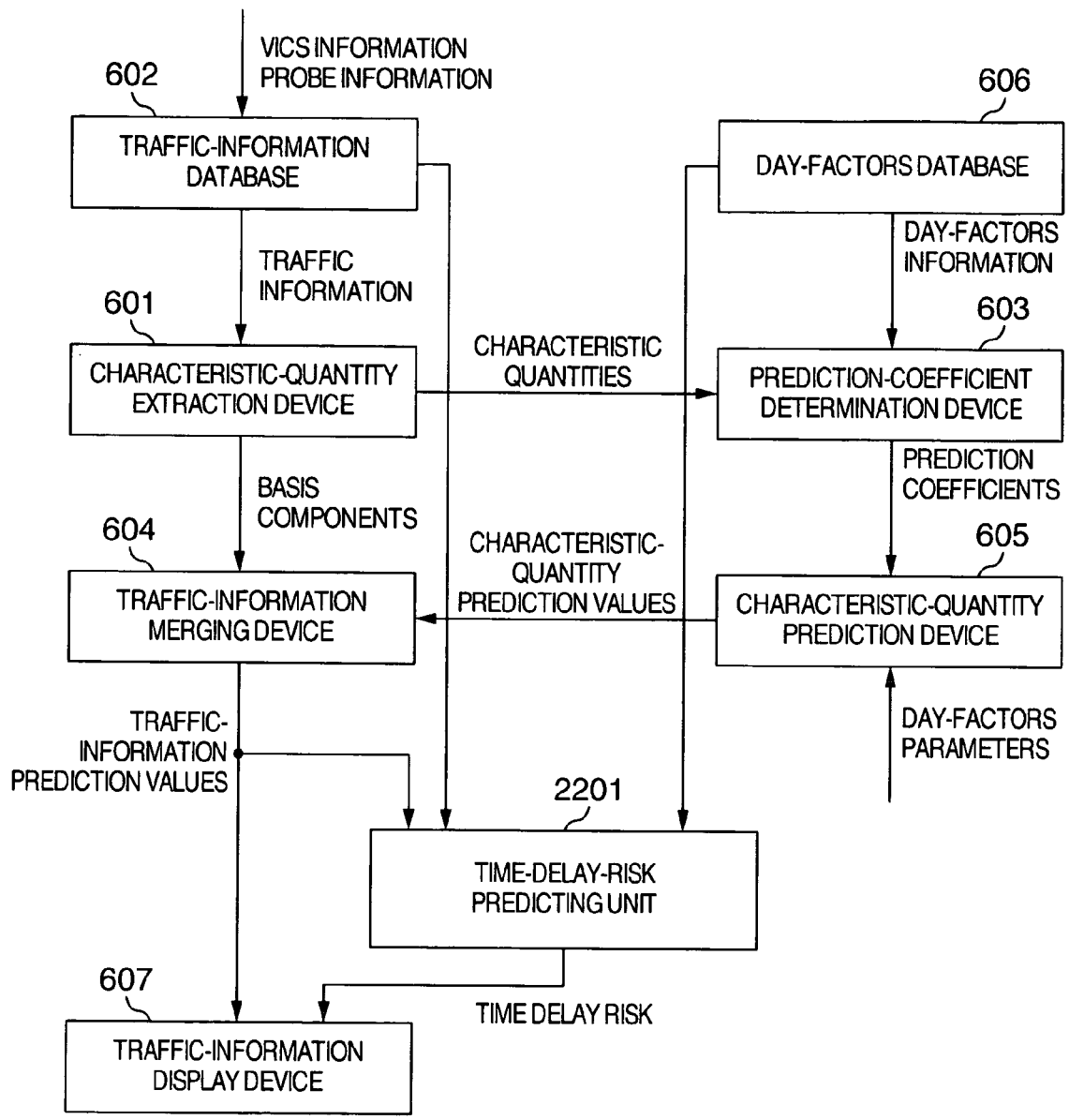
FIG. 22 is a block drawing for illustrating the traffic-information prediction system including a time-delay-risk predicting unit.

FIG. 22 is a block drawing for illustrating the traffic-information prediction system including the time-delay-risk predicting unit. In addition to the configuration in FIG. 6 explained in the first embodiment, the prediction system includes a time-delay-risk predicting unit 2201. This time-delay-risk predicting unit 2201 calculates the time delay risk from the day-factors database, the traffic-information database, and the traffic-information prediction values. For example, when calculating the time delay risk during a certain time-zone on a specific day as is shown in FIG. 20, the travel-time prediction value can be calculated using the method explained in the first embodiment. Travel-time data in the corresponding time-zone of day-factors data whose day-factors classification is the same as that of this prediction value from the day-factors database is fetched from the traffic-information database. This makes it possible to form probability density distribution of the travel time. Otherwise, the probability density distribution of the travel time may also be formed not from the traffic-information database, but from a set of travel-time prediction values of one and the same day-factors classification. Once the probability density distribution has been determined, expectation value of the necessity time and value of the percentile can be determined next. Moreover, the time delay risk of a predetermined time from this expectation value can be determined. When calculating a representative time delay risk in a section as is shown in 2102 in FIG. 21, the time delay risk is calculated by extracting the entire travel-time data regardless of differentiation among the day-factors classifications. Otherwise, the time delay risk is calculated by limiting the day-factors classifications to a specific day-factors classification to which the day-factors classification on a prediction-target day corresponds, and extracting travel-time data belonging to this specific day-factors classification. Basically, the time delay risk can be calculated by cumulative operation of the travel-time statistical data. It can also be considered, however, that the fact of the small sample-data number will exert influences on and narrow spread-width of the distribution. Taking this point into consideration, with respect to data whose data number is equal to N for example, the width of the distribution is multiplied by a value of t distribution whose degree of freedom is equal to (N−1) (e.g., reliability section 95% is used). This makes it possible to remove the influences exerted by the lack of the sample-data number.

Figure 23:
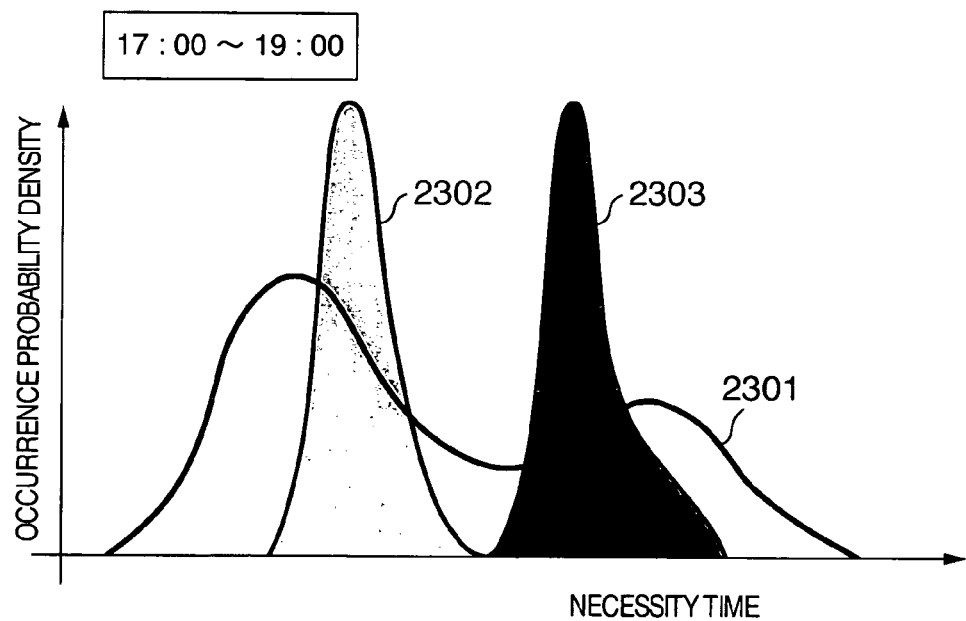
FIG. 23 illustrates an example of travel-time probability density distribution on each day-factor basis.

FIG. 23 illustrates an example of the travel-time probability density distribution classified on each day-factor basis. FIG. 23 illustrates the distribution of the travel time, where the transverse axis denotes the travel time, and the longitudinal axis denotes the occurrence probability density. The example in FIG. 23 indicates the distribution of the travel time during a time-zone of 17:00 to 19:00 in a certain section. Here, the following assumption is made: A distribution 2301 is a distribution of the travel time throughout one year, a distribution 2302 is a distribution on a holiday in spring, and a distribution 2303 is a distribution on a weekday in spring. As shown in the example in FIG. 23, when the day-factors classification has grasped characteristic of the traffic conditions accurately, a probability becomes higher that feet of the distributions become narrower. Accordingly, the use of the time delay risk classified on each day-factor basis makes it possible to make a plan corresponding to the day factors even in the case of the same time delay risk.

The traffic-information prediction device and method according to the present invention are usable for traffic-information providing services for common users. Also, the prediction device and method are usable for load-distribution/transportation systems in general which necessitate time management.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A traffic-information providing device, comprising:
a traffic-information database for recording past traffic-information time-sequence data,
a day factor input device for inputting plural day factors on a prediction-target day, or date of said prediction-target day, either one of the prediction-target day or the date of the prediction-target day being arranged to be inputted in a mutually exclusive manner by a tab-type interface indicated on a display screen of the day factor input device so as to permit arbitrary editing of the day factors
prediction target designating unit for inputting a prediction target route,
a traffic-information calculation device for determining, based on said past traffic-information time-sequence data, traffic-information time-sequence data for the prediction target route according to each of said plural day factors inputted from said day-factors input device,
a day factor database for storing day-factor classifications for road links, at least one of the links being arranged to include an area for which past traffic-information time sequence data has been stored in the traffic-information database, and
a day factor classification setting unit for updating day-factor classifications stored in the day-factor database, wherein
the day factor classification setting unit includes:
a route input device for specifying the prediction-target route between two locations for which a day factor is to be modified due to data input operation through the display screen of the day factor input device, and
day-factors classification specifying unit for setting day-factors classifications for each of said routes at which day-factor has been designated, wherein
said day-factors classification specifying unit sets said day-factors classifications for each prediction-target route specified by said route input device.

2. A traffic-information providing device, comprising:
a traffic-information database for recording past traffic-information time-sequence data,
a day factor input device for inputting plural day factors on a prediction-target day, or date of said prediction-target day, either one of the prediction-target day or the date of the prediction-target day being arranged to be inputted in a mutually exclusive manner by a tab-type interface indicated on a display screen of the day factor input device so as to permit arbitrary editing of the day factor
prediction target designating unit for inputting a prediction target route,
a traffic-information calculation device for determining, based on said past traffic-information time-sequence data, traffic-information time-sequence data for the prediction target route according to each of said plural day factors inputted from said day-factors input device, a day factor database for storing day-factor classifications for road links, at least one of the links being arranged to include an area for which past traffic-information time sequence data has been stored in the traffic-information database, and a day factor classification setting unit for updating day-factor classifications stored in the day-factor database, wherein the day factor classification setting unit includes:

an area input device for specifying an area in which day-factors classifications are to be set, and day-factors classification specifying unit for setting said day-factors classifications, wherein for each of said routes at which day-factor has been designated and which exists in said area specified by said area input device.

3. The traffic-information providing device according to claim 1, further comprising traffic-information managing means for managing traffic-information time-sequence data which differs for each user who has specified said day-factors classifications.

4. The traffic-information providing device according to claim 1, further comprising day-factors classification collecting means for collecting day-factors classification data for each user who has specified said day-factors classifications, said traffic-information calculation device determining traffic-information time-sequence data corresponding to said day-factors classifications collected.

5. A traffic-information providing device, comprising:

a traffic-information database for recording past traffic-information time-sequence data, a day factor input device for inputting plural day factors on a prediction-target day, or date of said prediction-target day, either one of the prediction-target day or the date of the prediction-target day being arranged to be inputted in a mutually exclusive manner by a tab-type interface indicated on a display screen of the day factor input device so as to permit arbitrary editing of the day prediction target designating unit for inputting a prediction target route, a traffic-information calculation device for determining, based on said past traffic-information time-sequence data, traffic-information time-sequence data for the prediction target route according to each of said plural day factors inputted from said day-factors input device, a day factor database for storing day-factor classifications for road links, at least one of the links being arranged to include an area for which past traffic-information time sequence data has been stored in the traffic-information database, and a day factor classification setting unit for updating day-factor classifications stored in the day-factor database, wherein the day factor classification setting unit includes:

a route input device for specifying the prediction-target route between two locations for which a day factor is to be modified, and means for determining a delay risk of necessity time in said specified route specified by said route input device.

6. The traffic-information providing device according to claim 5, wherein said arrival-time delay risk provided varies depending on said day factors and time-zones.

7. The traffic-information providing device according to claim 5, wherein said arrival-time delay risk provided is represented by combination of delay-time class value and delay occurrence probability, or by delay risk level.

* * * * *